US 12,256,760 B2

(12) United States Patent
Wenger et al.

(10) Patent No.: US 12,256,760 B2
(45) Date of Patent: Mar. 25, 2025

(54) METHOD AND APPARATUS FOR PRODUCTION OF HIGH MEAT CONTENT PET FOODS

(71) Applicant: Wenger Manufacturing Inc., Sabetha, KS (US)

(72) Inventors: LaVon Wenger, Sabetha, KS (US); Allan C. Spellmeier, Fairview, KS (US); Philip B. Wiltz, Sabetha, KS (US)

(73) Assignee: Wenger Manufacturing, LLC, Sabetha, KS (US)

(*) Notice: Subject to any disclaimer, the term of this patent is extended or adjusted under 35 U.S.C. 154(b) by 1361 days.

(21) Appl. No.: 16/716,758

(22) Filed: Dec. 17, 2019

(65) Prior Publication Data
US 2020/0120955 A1 Apr. 23, 2020

Related U.S. Application Data

(60) Division of application No. 16/024,351, filed on Jun. 29, 2018, now abandoned, which is a
(Continued)

(51) Int. Cl.
A23K 10/20 (2016.01)
A23K 10/26 (2016.01)
(Continued)

(52) U.S. Cl.
CPC ............. A23K 10/20 (2016.05); A23K 10/26 (2016.05); A23K 20/158 (2016.05);
(Continued)

(58) Field of Classification Search
CPC .... A23K 10/20; A23K 20/158; A23K 20/163; A23K 40/25; A23K 50/42; A23K 10/26
See application file for complete search history.

(56) References Cited

U.S. PATENT DOCUMENTS

| 617,735 A | 1/1899 | Godfrey |
| 675,179 A | 5/1901 | Wacker |

(Continued)

FOREIGN PATENT DOCUMENTS

| CH | 193324 | 10/1937 |
| CN | 1456069 | 11/2003 |

(Continued)

OTHER PUBLICATIONS

"SBX Master Preconditioner". Available online at https://www.bakerperkinsgroup.com/food-extrusion/equipment/extrusion-co-extrusion/sbx-master-preconditioner (Year: 2017).*

(Continued)

Primary Examiner — Donald R Spamer
Assistant Examiner — Assaf Zilbering
(74) Attorney, Agent, or Firm — Hovey Williams LLP

(57) ABSTRACT

High meat content extruded pet feeds and methods of preparation thereof, make use of relatively high meat contents which include quantities of previously dewatered meat. In an embodiment, the total meat content of the feeds consists essentially of dewatered emulsified poultry meat or other meat sources commonly used in the pet food industry. In the methods, mixtures containing starch, fat, and meat, the latter including dewatered meat, are passed through an extruder followed by staged drying. The extruder may be of twin screw design having hollow core screws permitting introduction of steam or other heat exchange media into the screws.

21 Claims, 14 Drawing Sheets

Related U.S. Application Data continuation-in-part of application No. 15/840,926, filed on Dec. 13, 2017, now Pat. No. 10,555,547, and a continuation-in-part of application No. 15/699,642, filed on Sep. 8, 2017, now Pat. No. 10,434,483.

(60) Provisional application No. 62/645,301, filed on Mar. 20, 2018.

(51) Int. Cl.
*A23K 20/158* (2016.01)
*A23K 20/163* (2016.01)
*A23K 40/25* (2016.01)
*A23K 50/42* (2016.01)

(52) U.S. Cl.
CPC ............ *A23K 20/163* (2016.05); *A23K 40/25* (2016.05); *A23K 50/42* (2016.05)

(56) References Cited

U.S. PATENT DOCUMENTS

| | | |
|---|---|---|
| 1,762,368 A | 6/1930 | Vandergrift |
| 1,972,929 A | 9/1934 | Fisher |
| 2,027,185 A | 1/1936 | Loomis |
| 2,136,264 A | 11/1938 | Kiesskalt et al. |
| 2,321,185 A | 6/1943 | Christian |
| 2,321,285 A | 6/1943 | Ehret et al. |
| 2,458,068 A | 1/1949 | Fuller |
| 2,567,219 A | 9/1951 | Lesniak |
| 2,624,552 A | 1/1953 | Rose |
| 2,722,716 A | 11/1955 | Henning |
| 2,731,241 A | 1/1956 | Christian |
| 2,233,898 A | 2/1956 | Christian |
| 2,753,159 A | 7/1956 | Christian |
| 2,883,163 A | 4/1959 | Solheim |
| 3,020,025 A | 2/1962 | O'Mara |
| 3,021,782 A | 2/1962 | Ginaven |
| 3,143,768 A | 8/1964 | Scherping |
| 3,191,229 A | 6/1965 | Vanzo |
| 3,255,814 A | 6/1966 | Zimmermann et al. |
| 3,259,374 A | 7/1966 | Doebl et al. |
| 3,285,330 A | 11/1966 | Root |
| 3,325,864 A | 6/1967 | Kohyama et al. |
| 3,367,126 A | 2/1968 | Howell |
| 3,386,131 A | 6/1968 | Vanzo |
| 3,386,708 A | 6/1968 | Christian |
| 3,395,805 A | 8/1968 | Holden |
| 3,398,900 A | 8/1968 | Guba et al. |
| 3,407,080 A | 10/1968 | Rainwater et al. |
| 3,426,838 A | 2/1969 | Onarheim |
| 3,450,537 A | 6/1969 | Filstrup |
| 3,461,793 A | 8/1969 | Solberg |
| 3,486,740 A | 12/1969 | Christian |
| 3,500,901 A | 3/1970 | Root et al. |
| 3,529,661 A | 9/1970 | Yousch |
| 3,548,926 A | 12/1970 | Archer |
| 3,563,710 A | 2/1971 | Dew, Jr. et al. |
| 3,565,403 A | 2/1971 | Matsuoka |
| 3,580,389 A | 5/1971 | Nonnenmacher |
| 3,594,190 A | 7/1971 | Eslinger et al. |
| 3,596,712 A | 8/1971 | Matsuoka et al. |
| 3,613,777 A | 10/1971 | Nara |
| 3,637,069 A | 1/1972 | Christian et al. |
| 3,688,837 A | 9/1972 | Ocker |
| 3,698,541 A | 10/1972 | Barr |
| 3,738,420 A | 6/1973 | Poux et al. |
| 3,764,062 A | 10/1973 | Brautigam |
| 3,764,118 A | 10/1973 | Matsuoka |
| 3,765,481 A | 10/1973 | Root |
| 3,776,529 A | 12/1973 | Sutter et al. |
| 3,800,865 A | 4/1974 | Onarheim et al. |
| 3,802,670 A | 4/1974 | Okada et al. |
| 3,856,278 A | 12/1974 | Eisenmann |
| 3,923,097 A | 12/1975 | Hovad |
| 3,976,799 A | 8/1976 | Kelly et al. |
| 4,004,129 A | 1/1977 | Hicks |
| 4,022,915 A | 5/1977 | Zukerman |
| 4,040,768 A | 8/1977 | Christian |
| 4,125,945 A | 11/1978 | Westelaken |
| 4,134,714 A | 1/1979 | Driskill |
| 4,183,674 A | 1/1980 | Sudo et al. |
| 4,183,676 A | 1/1980 | Engels et al. |
| 4,185,123 A | 1/1980 | Wenger et al. |
| 4,233,676 A | 11/1980 | Luecke et al. |
| 4,330,562 A | 5/1982 | Nassar |
| 4,372,734 A | 2/1983 | Dolan et al. |
| 4,393,983 A | 7/1983 | Eriksson |
| 4,408,888 A | 10/1983 | Hanslik |
| 4,425,962 A | 1/1984 | Cameron |
| 4,438,691 A | 3/1984 | Solberg |
| 4,457,227 A | 7/1984 | Koch |
| 4,542,686 A | 9/1985 | Bansal |
| 4,565,124 A | 1/1986 | Stautland et al. |
| 4,636,127 A | 1/1987 | Olano et al. |
| 4,642,241 A | 2/1987 | Noguchi |
| 4,698,310 A | 10/1987 | Wikholm et al. |
| 4,729,902 A | 3/1988 | Urman et al. |
| 4,818,206 A | 4/1989 | Maillefer |
| 4,856,580 A | 8/1989 | Ley |
| 4,868,002 A | 9/1989 | Scaglione et al. |
| 4,910,038 A | 3/1990 | Ducharme |
| 4,935,183 A | 6/1990 | Wenger et al. |
| 5,074,057 A | 12/1991 | Kanai |
| 5,120,559 A | 6/1992 | Rizvi et al. |
| 5,135,355 A | 8/1992 | Colley et al. |
| 5,232,280 A | 8/1993 | Moriyama |
| 5,242,292 A | 9/1993 | Wenger |
| 5,252,351 A | 10/1993 | Cox et al. |
| 5,333,556 A | 8/1994 | Isobe et al. |
| 5,350,585 A | 9/1994 | Sunderland |
| 5,357,855 A | 10/1994 | Ishigaki et al. |
| 5,372,418 A | 12/1994 | Biesenberger et al. |
| 5,410,984 A | 5/1995 | Pikus et al. |
| 5,417,155 A | 5/1995 | Tatsuzawa et al. |
| 5,417,492 A | 5/1995 | Christian et al. |
| 5,431,927 A | 7/1995 | Hand et al. |
| 5,500,239 A | 3/1996 | Hayward |
| 5,547,277 A | 8/1996 | Caspelherr et al. |
| 5,628,560 A | 5/1997 | Eigruber |
| 5,694,833 A | 12/1997 | Wenger |
| 5,695,797 A | 12/1997 | Geromini et al. |
| 5,718,508 A | 2/1998 | Williams |
| 5,743,178 A | 4/1998 | Babbini |
| 5,750,158 A | 5/1998 | Wissmann et al. |
| 5,863,197 A | 1/1999 | Boy et al. |
| 5,887,972 A | 3/1999 | Dickmeiss et al. |
| 5,894,029 A | 4/1999 | Brown et al. |
| 5,894,803 A | 4/1999 | Kuga |
| 5,964,278 A | 10/1999 | Langoy et al. |
| 5,997,934 A | 12/1999 | Geromini et al. |
| 6,099,159 A | 8/2000 | Yoshida et al. |
| 6,099,288 A | 8/2000 | Long |
| 6,105,490 A | 8/2000 | Horn et al. |
| 6,170,168 B1 | 1/2001 | Fosbøl et al. |
| 6,234,661 B1 | 5/2001 | Thewes |
| 6,238,726 B1 | 5/2001 | Fischer |
| 6,410,079 B2 | 6/2002 | Cheuk et al. |
| 6,550,376 B2 | 4/2003 | Johnston |
| 6,609,819 B2 | 8/2003 | Hauck et al. |
| 6,688,217 B2 | 2/2004 | Hauck et al. |
| 6,805,480 B1 | 10/2004 | Behling |
| 7,097,345 B2 | 8/2006 | Ueda et al. |
| 7,191,700 B2 | 3/2007 | Sasaki |
| 7,322,738 B2 | 1/2008 | Yamane et al. |
| 7,448,795 B2 | 11/2008 | Wenger et al. |
| 7,521,076 B1 | 4/2009 | Wenger et al. |
| 7,632,006 B2 | 12/2009 | Schulz |
| 7,731,879 B2 | 6/2010 | Winter et al. |
| 8,079,747 B2 | 12/2011 | Ek et al. |
| 8,118,479 B2 | 2/2012 | van Elderen et al. |
| 8,151,482 B2 | 4/2012 | Moss et al. |
| 8,444,828 B2 | 5/2013 | Wolfe |
| 8,496,985 B2 | 7/2013 | Langford |

(56) References Cited

U.S. PATENT DOCUMENTS

| | | |
|---|---|---|
| 8,596,856 B2 | 12/2013 | Chang |
| 8,647,690 B2 | 2/2014 | Corrigan |
| 8,944,672 B2 | 2/2015 | Wenger et al. |
| 8,999,422 B2 | 4/2015 | Wenger et al. |
| 9,004,152 B2 | 4/2015 | Yoshihara et al. |
| 9,045,693 B2 | 6/2015 | Wolfe |
| 9,316,439 B2 | 4/2016 | Tucker |
| 9,321,190 B2 | 4/2016 | Martel et al. |
| 9,908,090 B2 | 3/2018 | VanDalsem et al. |
| 10,434,483 B2 | 10/2019 | Wenger et al. |
| 10,555,547 B2 | 2/2020 | Wenger et al. |
| 10,624,369 B2 | 4/2020 | Wenger et al. |
| 10,624,382 B2 | 4/2020 | Wenger et al. |
| 10,736,340 B1 | 8/2020 | Rokey et al. |
| 10,893,688 B2 | 1/2021 | Wenger et al. |
| 11,039,629 B2 | 6/2021 | Wenger et al. |
| 11,241,026 B2 | 2/2022 | Wenger et al. |
| 2001/0053405 A1 | 12/2001 | Cheuk et al. |
| 2002/0119241 A1 | 8/2002 | Speck et al. |
| 2002/0122850 A1 | 9/2002 | Kartchner |
| 2002/0192341 A1 | 12/2002 | Pope et al. |
| 2003/0021860 A1 | 1/2003 | Clock et al. |
| 2004/0086616 A1 | 5/2004 | Nie et al. |
| 2004/0234641 A1 | 11/2004 | Ueda et al. |
| 2005/0219943 A1 | 10/2005 | Yamane et al. |
| 2005/0220979 A1 | 10/2005 | Baumer et al. |
| 2006/0210695 A1 | 9/2006 | Ganjyal |
| 2007/0077336 A1 | 4/2007 | Fulcher et al. |
| 2007/0163966 A1 | 7/2007 | Hilgren et al. |
| 2008/0069916 A1 | 3/2008 | Regalia |
| 2008/0248167 A1 | 10/2008 | McMindes et al. |
| 2009/0068336 A1 | 3/2009 | Torney et al. |
| 2009/0098267 A1 | 4/2009 | Pettelot et al. |
| 2009/0213681 A1 | 8/2009 | Ek et al. |
| 2009/0263564 A1* | 10/2009 | Kang ................ A23L 13/60 426/644 |
| 2009/0297664 A1 | 12/2009 | Forte et al. |
| 2009/0324790 A1 | 12/2009 | Hilgren et al. |
| 2011/0262609 A1 | 10/2011 | Wenger et al. |
| 2012/0237642 A1 | 9/2012 | Gardewin |
| 2013/0264264 A1 | 10/2013 | Lehoux et al. |
| 2014/0027095 A1 | 1/2014 | Warchol et al. |
| 2014/0087044 A1* | 3/2014 | Wenger ................ A23K 40/20 426/465 |
| 2015/0020695 A1 | 1/2015 | Wenger |
| 2015/0131399 A1 | 5/2015 | Brunner et al. |
| 2015/0173384 A1 | 6/2015 | Oustric et al. |
| 2015/0181907 A1 | 7/2015 | Baumer et al. |
| 2016/0219904 A1 | 8/2016 | Reynes |
| 2016/0330998 A1 | 11/2016 | Jimenez-Marquez et al. |
| 2017/0013848 A1 | 1/2017 | Jorgensen et al. |
| 2017/0042164 A1 | 2/2017 | Maeda |
| 2017/0367369 A1 | 12/2017 | Rodriguez et al. |
| 2018/0214833 A1 | 8/2018 | Kashima et al. |
| 2018/0228183 A1 | 8/2018 | Wenger et al. |
| 2018/0229197 A1 | 8/2018 | Wenger et al. |
| 2019/0075822 A1 | 3/2019 | Wenger et al. |
| 2019/0233316 A1 | 8/2019 | Miller et al. |
| 2019/0247813 A1 | 8/2019 | Wenger et al. |
| 2019/0299178 A1 | 10/2019 | Wenger et al. |
| 2019/0299179 A1 | 10/2019 | Wenger et al. |
| 2019/0364929 A1 | 12/2019 | Wenger et al. |
| 2020/0060308 A1 | 2/2020 | Manchuliantsau et al. |
| 2020/0113222 A1 | 4/2020 | Wenger et al. |
| 2020/0120970 A1 | 4/2020 | Rokey et al. |
| 2020/0068020 A1 | 8/2020 | Rokey et al. |
| 2021/0068424 A1 | 3/2021 | Rokey et al. |
| 2021/0337831 A1 | 11/2021 | Wenger et al. |

FOREIGN PATENT DOCUMENTS

| | | |
|---|---|---|
| CN | 101103825 A | 1/2008 |
| CN | 101531054 A | 9/2009 |
| CN | 201439223 U | 4/2010 |
| CN | 102225317 A | 10/2011 |
| CN | 102275285 A | 12/2011 |
| CN | 202062635 U | 12/2011 |
| CN | 102490340 A | 6/2012 |
| CN | 104171487 A | 12/2014 |
| CN | 105476051 | 4/2016 |
| CN | 105559118 A | 5/2016 |
| CN | 205528350 U | 8/2016 |
| CN | 106418615 A | 2/2017 |
| CN | 106490668 | 3/2017 |
| CN | 206724651 U | 12/2017 |
| DE | 10113949 A1 | 9/2002 |
| EP | 0041641 A2 | 12/1981 |
| EP | 0184930 A1 | 6/1986 |
| EP | 0358837 B2 | 7/2003 |
| EP | 1479504 (1 A1 | 11/2004 |
| EP | 2146147 A2 | 1/2010 |
| EP | 2499922 A1 | 9/2012 |
| EP | 2810560 A1 | 12/2014 |
| FR | 2477429 A1 | 9/1981 |
| GB | 1525121 | 9/1978 |
| JP | 1986(S61)158885 A | 7/1986 |
| JP | 1990(H2)251397 A | 10/1990 |
| JP | 2004338343 (1 A | 12/2004 |
| JP | 2005506062 (2 A | 3/2005 |
| JP | 2015514006 A | 5/2015 |
| JP | 2015116581 A | 6/2015 |
| KR | 1020040027873 | 4/2004 |
| RU | 2013111266 A | 9/2014 |
| WO | 9314921 A1 | 8/1993 |
| WO | 9803088 A2 | 1/1998 |
| WO | 9947000 A1 | 9/1999 |
| WO | 2003009982 (2 A2 | 2/2003 |
| WO | 2004080704 A1 | 9/2004 |
| WO | 2010138372 A2 | 12/2010 |
| WO | 2014168763 A1 | 10/2014 |
| WO | 2018152346 A1 | 8/2018 |
| WO | 2019182630 A1 | 9/2019 |

OTHER PUBLICATIONS

"Stabilization of meat suspensions by organogelation: A rheological approach" Eur. J. Lipid Sci. Technol. 2012, 114, 1381-1389 (Year: 2012).*

Office Action received in corresponding Argentina Application No. P180102101 dated Sep. 29, 2022.

Office Action received in corresponding Brazil Application No. BR112020018953-7 dated Apr. 30, 2023, including machine translation.

Office Action received in corresponding Korea Application No. 10-2020-7028534 dated Jun. 12, 2023, including machine translation.

Amruthraj, Bharath. "Design of Twin Screw Oil Expeller for Pongamia Pinnata Seeds." International Journal of Emerging Technology and Advance Engineering, 4:3 2014.

Baldwin. "Adding flexibility to the extrusion process." Animal Feed, 2007.

Extended European Search Report in EP18910550.5 (PCT/US18/40449), dated Oct. 7, 2021.

Extended European Search Report in EP 18753775.8 (PCT/US2018/018396), dated Mar. 17, 2020.

Extended European Search Report in EP 18753587.7 (PCT/US2018/018398), dated Mar. 11, 2020.

International Search Report and Written Opinion in PCT/US2018/018396 dated May 31, 2018.

International Search Report and Written Opinion in PCT/US2018/018398, dated Jun. 1, 2018.

International Search Report and Written Opinion in PCT/US18/40449, dated Nov. 9, 2018.

International Search Report and Written Opinion in PCT/US19/53371, dated Jan. 17, 2020.

International Search Report and Written Opinion in PCT/US21/52333 dated Jan. 5, 2022.

JSW brochure, Twin Screw Extruder, 2014.

(56) References Cited

OTHER PUBLICATIONS

Lawal et al. "Mechanisms of Mixing in Single and Co-Rotating Twin Screw Extruders." Polymer Engineering and Science, 35:17 1995.
MLA Report, Evaluation and development of high moisture extruded red meat trim products, 2011.
Office Action in U.S. Appl. No. 15/699,642 dated May 10, 2019.
Office Action in U.S. Appl. No. 15/699,642 dated Jun. 3, 2019.
Office Action in U.S. Appl. No. 15/840,926 dated Aug. 13, 2019.
Office Action in U.S. Appl. No. 15/840,926 dated Nov. 4, 2019.
Office Action in U.S. Appl. No. 16/024,351 dated Mar. 25, 2020.
Office Action in U.S. Appl. No. 16/446,142 dated Sep. 9, 2020.
Office Action in U.S. Appl. No. 16/446,142 dated Oct. 2, 2020.
Office Action in U.S. Appl. No. 16/446,142 dated Oct. 30, 2020.
Office Action in U.S. Appl. No. 16/393,228 dated Nov. 20, 2020.
Rokey et al. "Pet Food Extrusion" presentation. 68th Reciprocal Meat Conference, 2015.
Schneider. "Conical and Counter-Rotating: The Length Makes the Difference." Kunststoffe international 2012.
Wenger Manufacturing Inc. PowerPoint Presentation entitled "Jerky Long Goods", dated Sep. 7, 2018.
Office Action in U.S. Appl. No. 16/716,758 dated Sep. 29, 2022.
Office Action in U.S. Appl. No. 16/716,758 dated Dec. 8, 2023.
"Gentle 2-stage Drying" LARSSON Whirl Flash™ dryer http://www.larssonsweden.com/wp-content/uploads/2016/06/DO0046001-A2.1-EN-Whirl-Flash-Dryer.pdf (Accessed Apr. 23, 2018).
"Production plants from a single source." Aquafeed. https://www.buhlergroup.com/china/zh/downloads/Aquafeed.pdf (Accessed Apr. 23, 2018).
Ariyawansa, Sujeewa. "The evaluation of functional properties of fish meal."—United Nations University, Fisheries Training Programme, Project Final, Sri Lanka—25 (2000). pp. 10 and 14.
"SBX Master Preconditioner". Available online at https:/Avww.bakerperkinsgroup.com/food-extrusion/equipment/extrusion-co-extrusion/sbx-master-preconditioner (Year: 2017).
Office Action in U.S. Appl. No. 16/716,758 dated May 25, 2023.

* cited by examiner

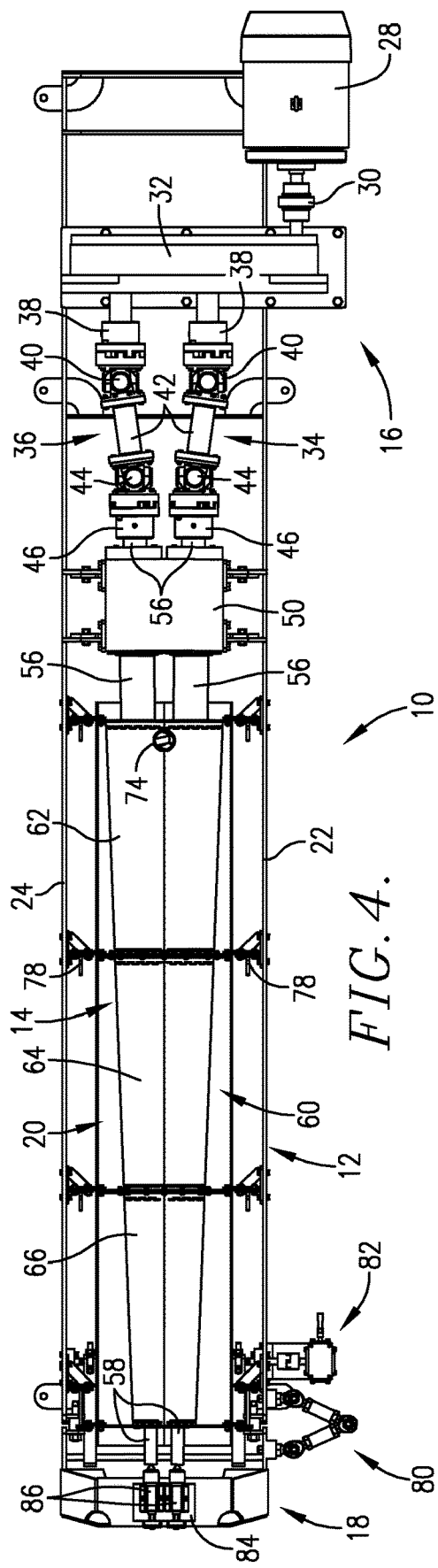
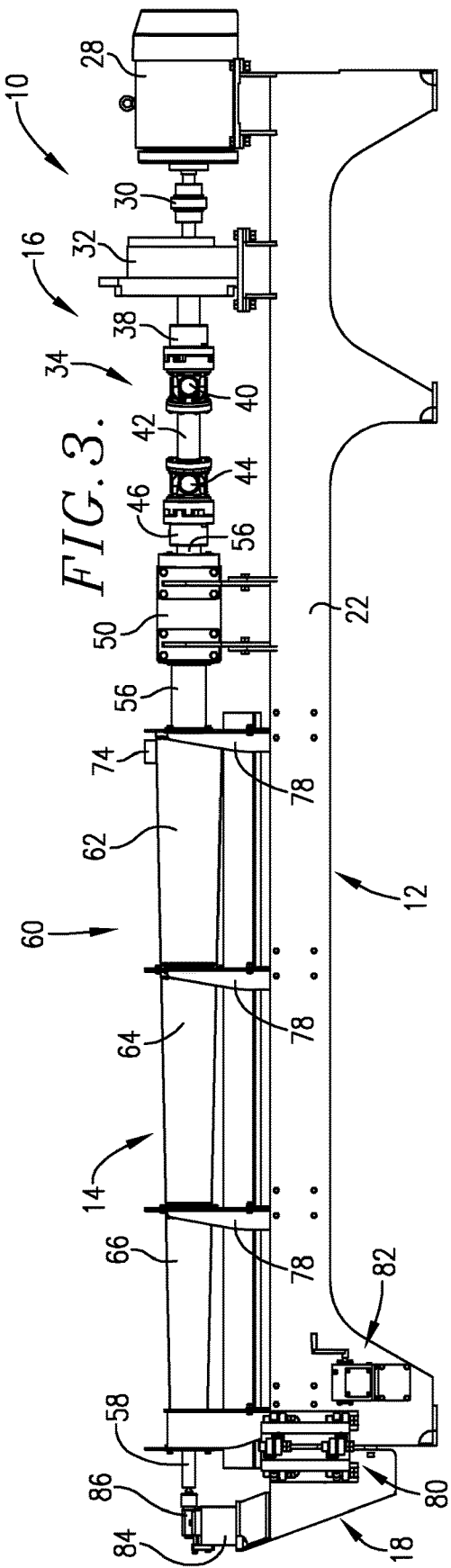

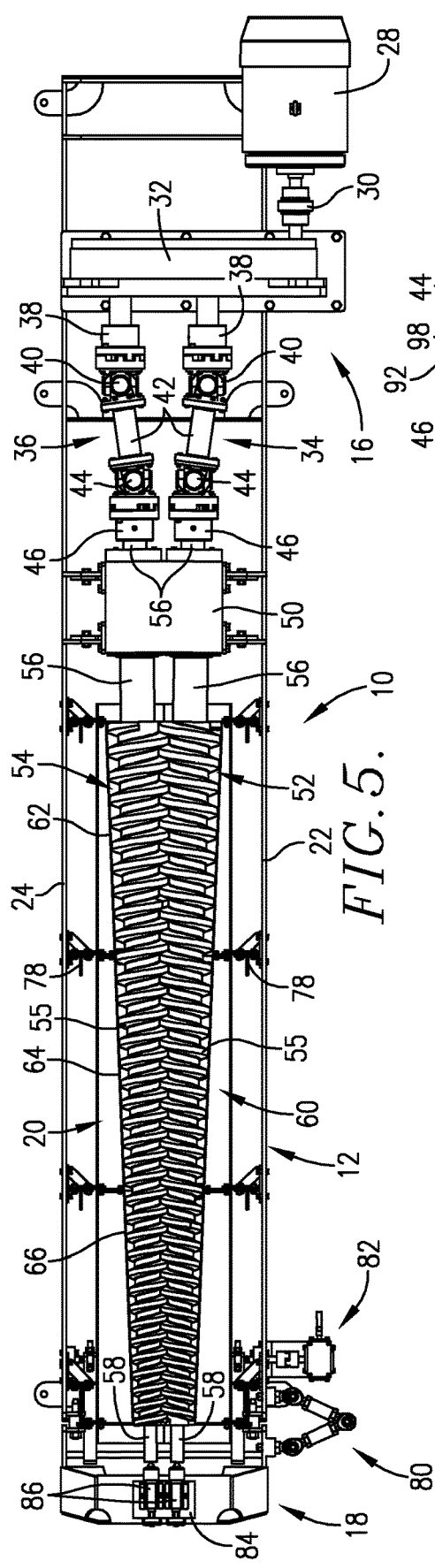
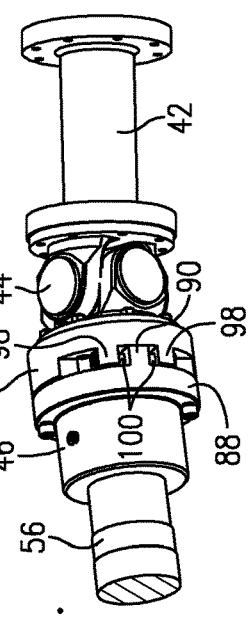
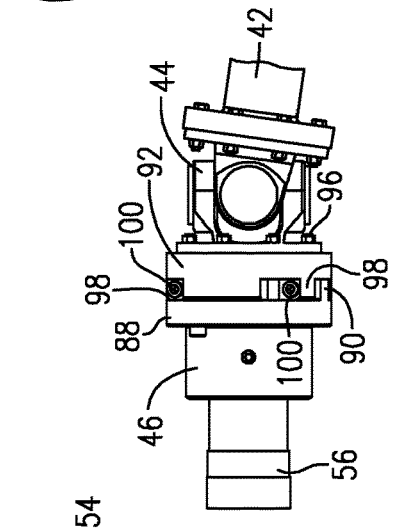
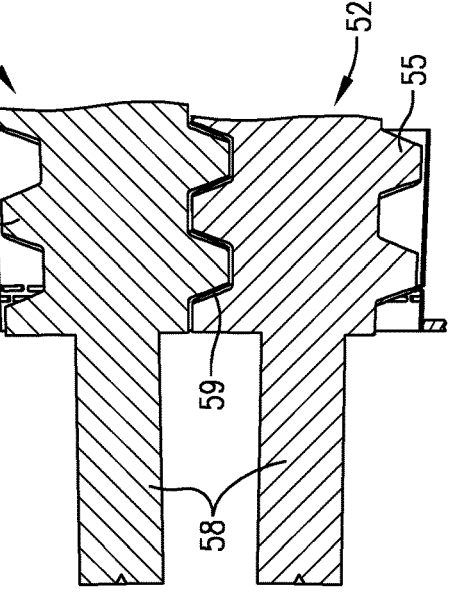
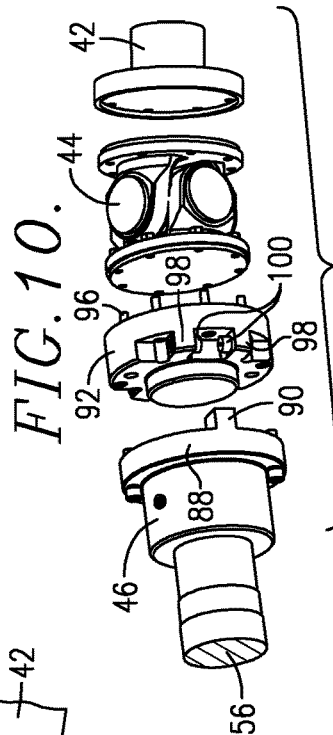

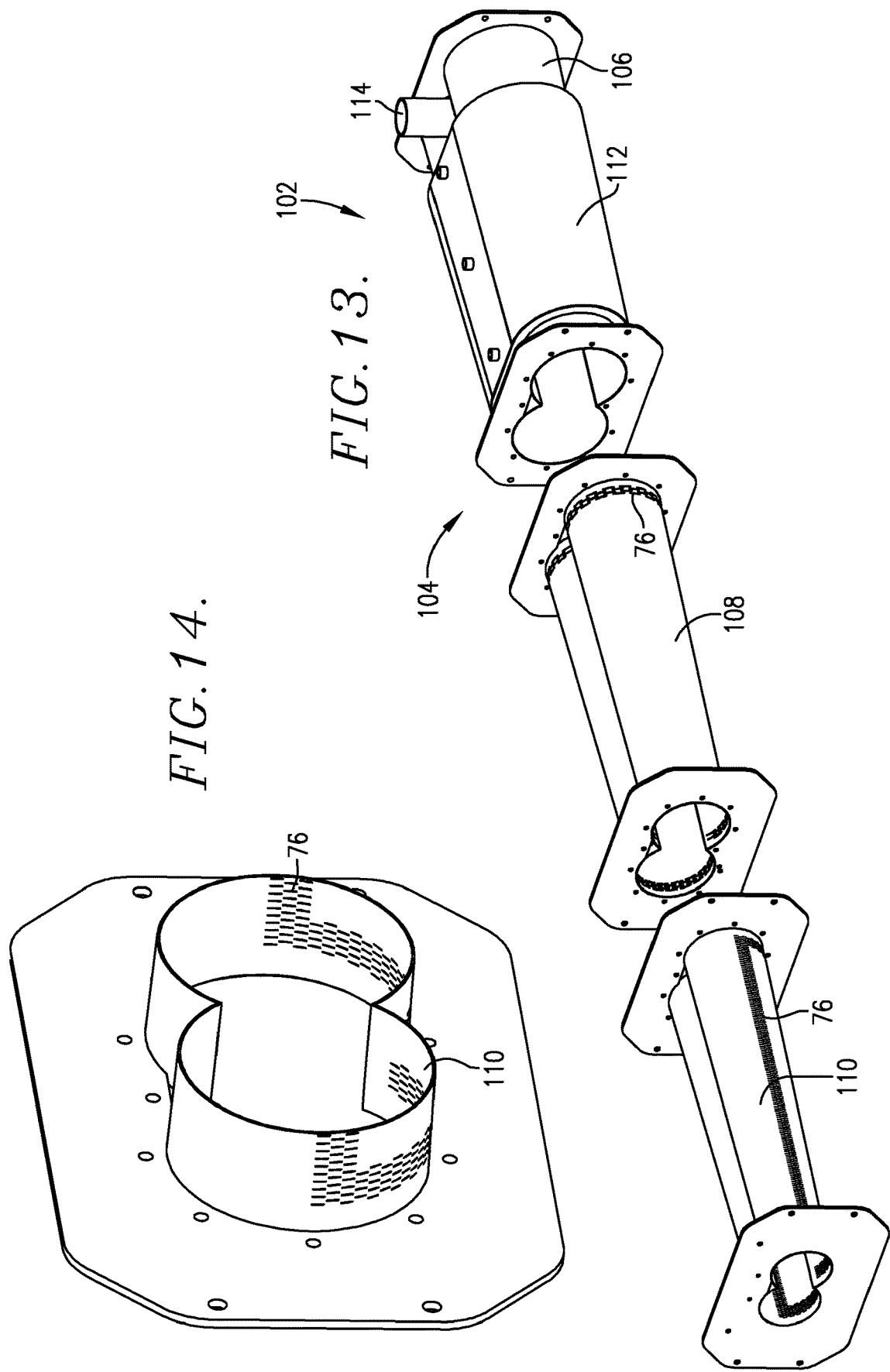

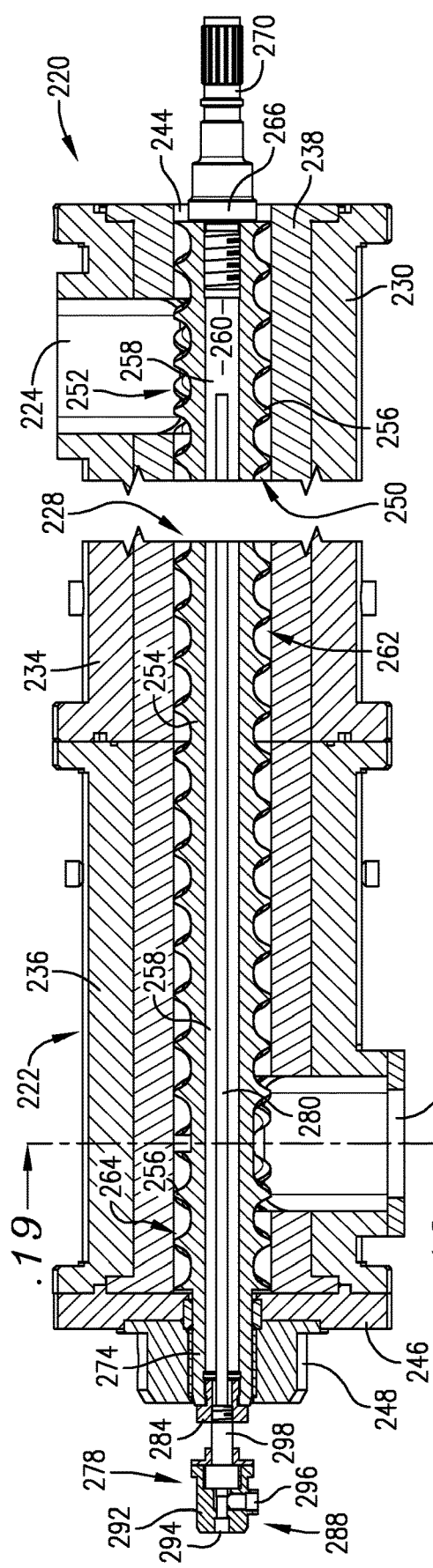
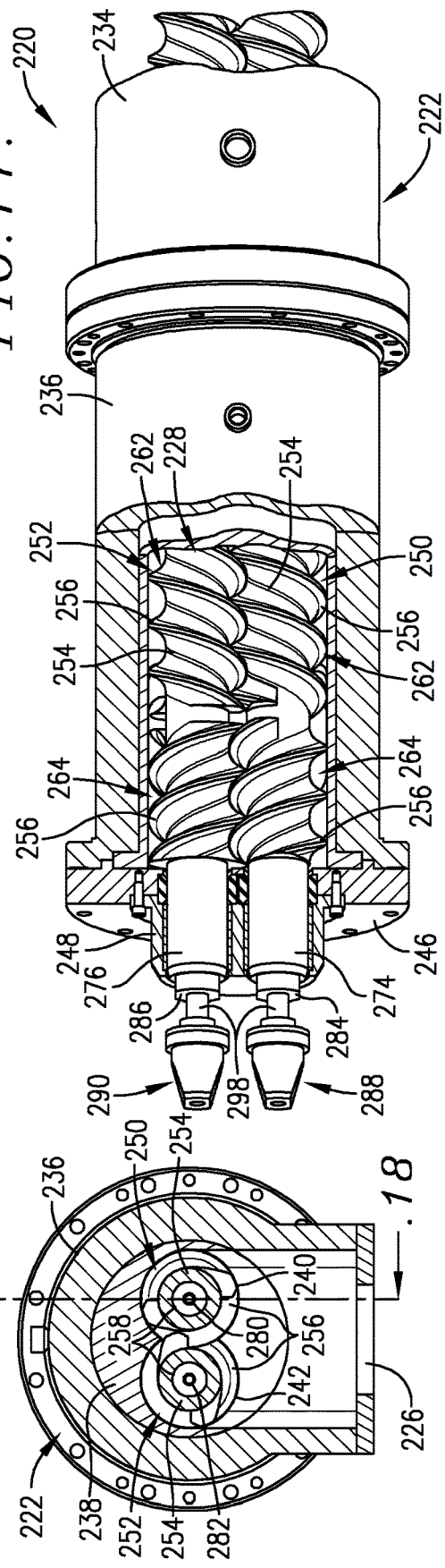
FIG. 17.
FIG. 18.
FIG. 19.

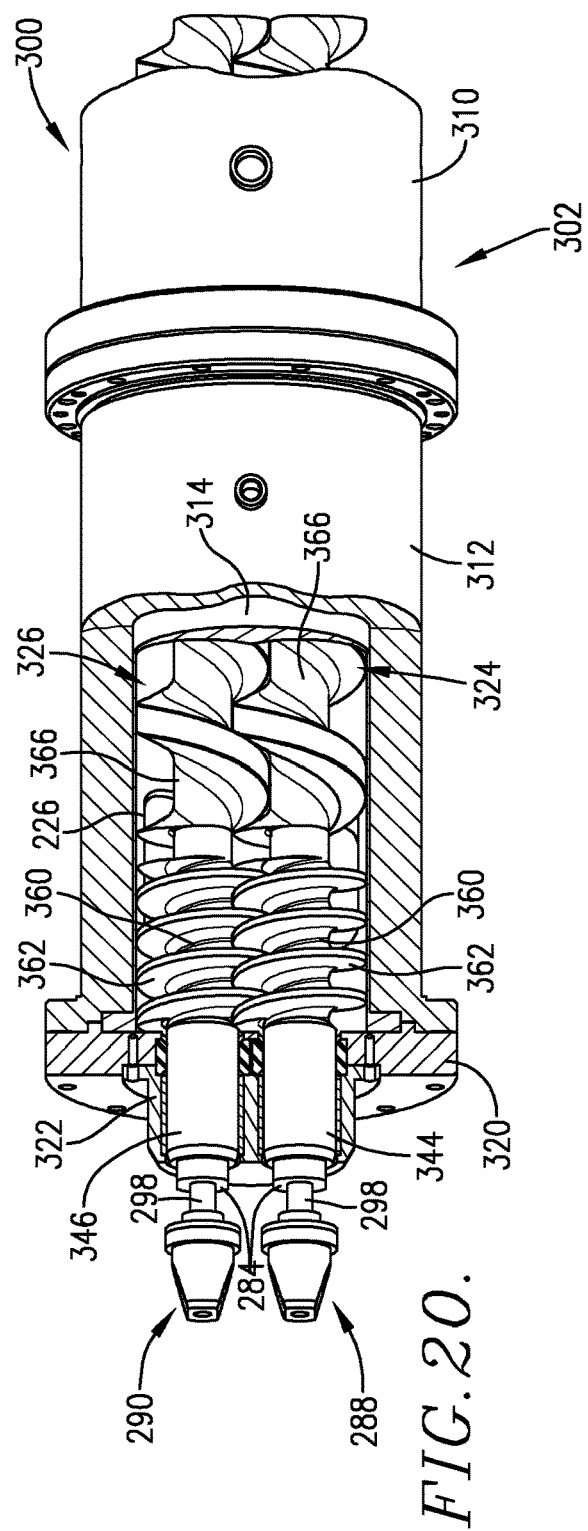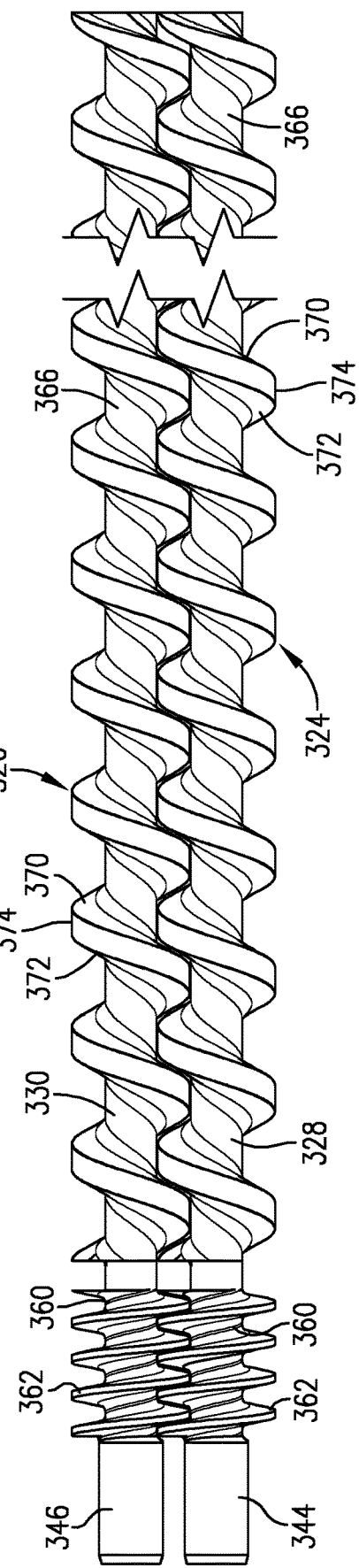

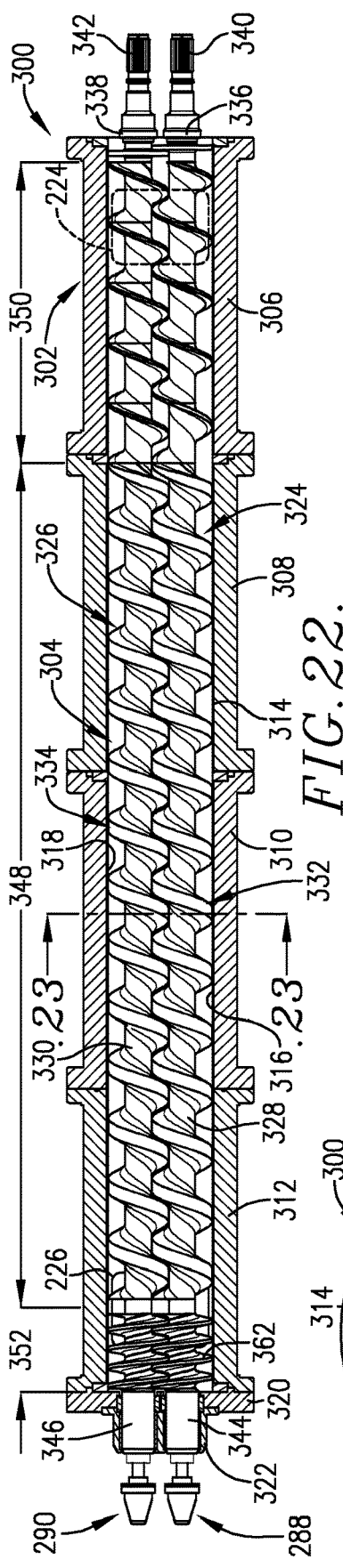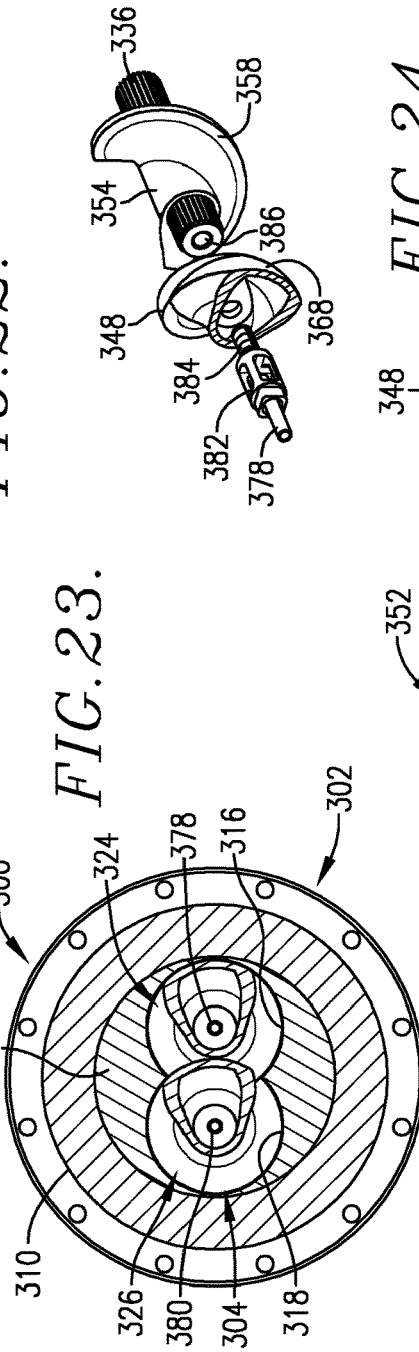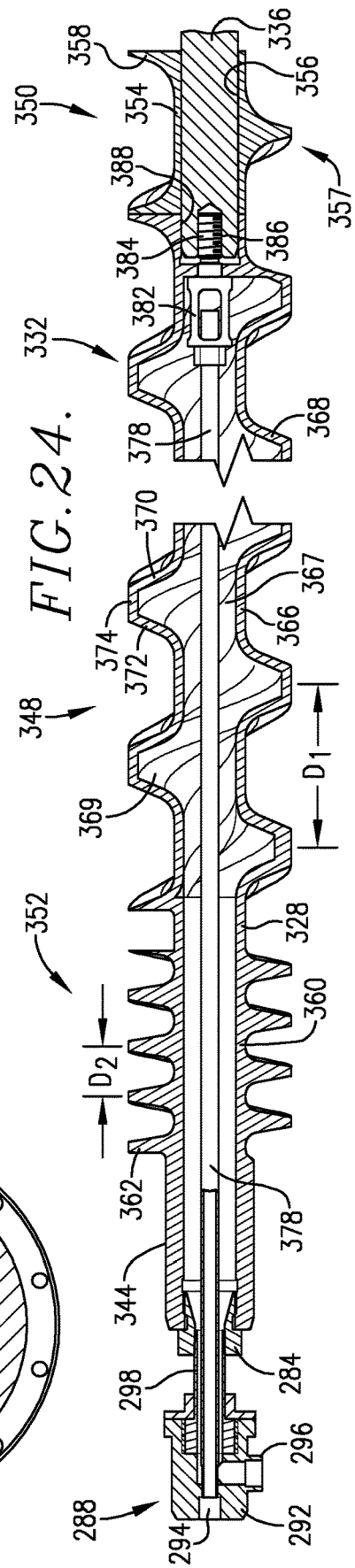
FIG.22.
FIG.23.
FIG.24.
FIG.25.

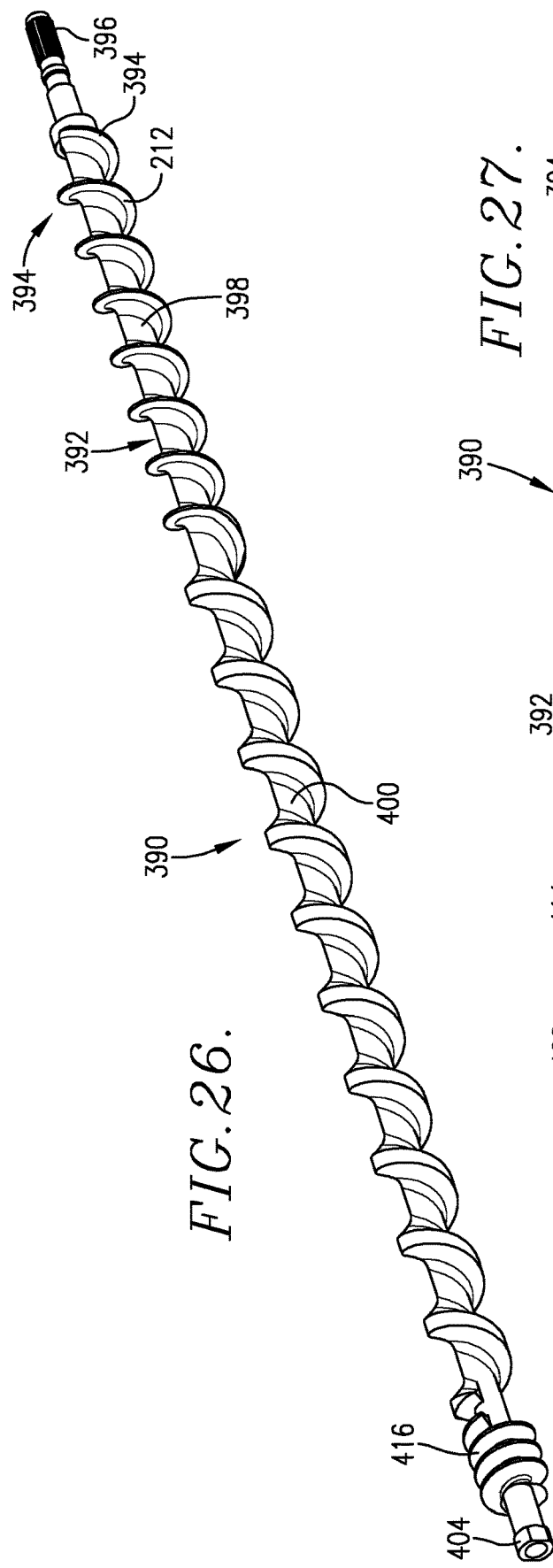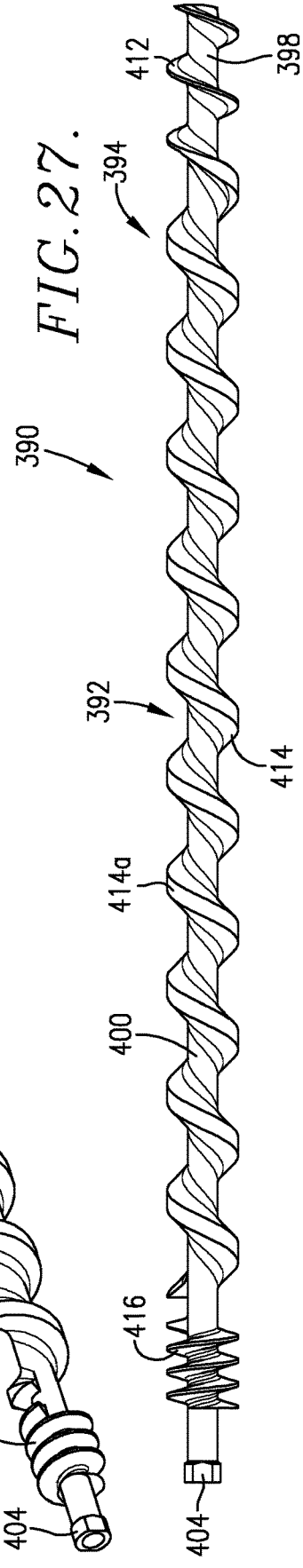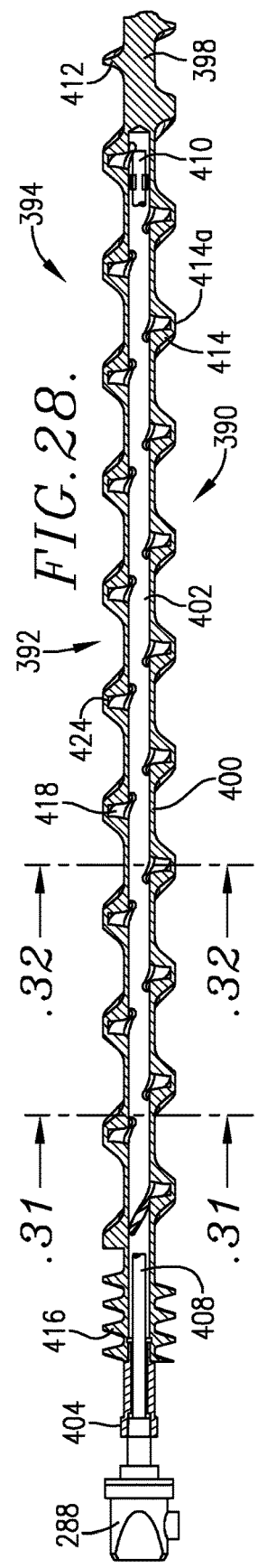

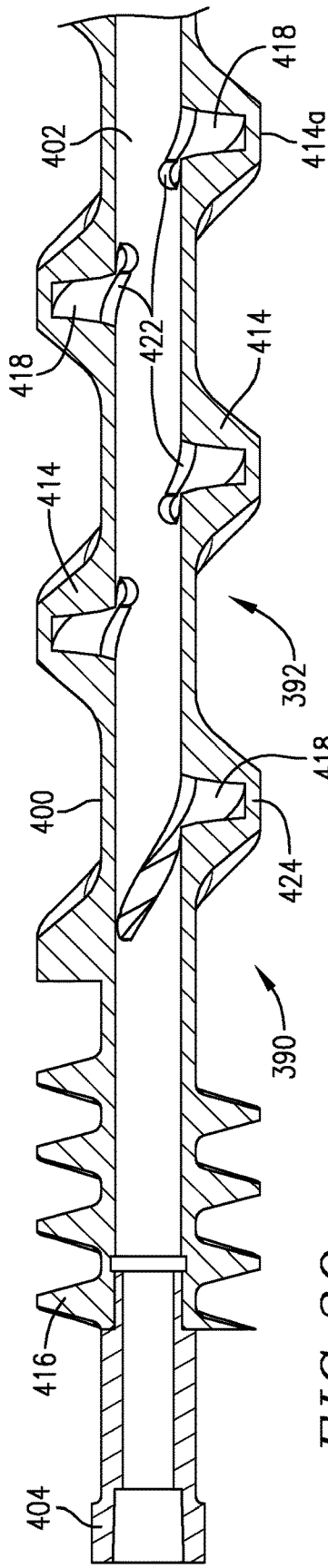
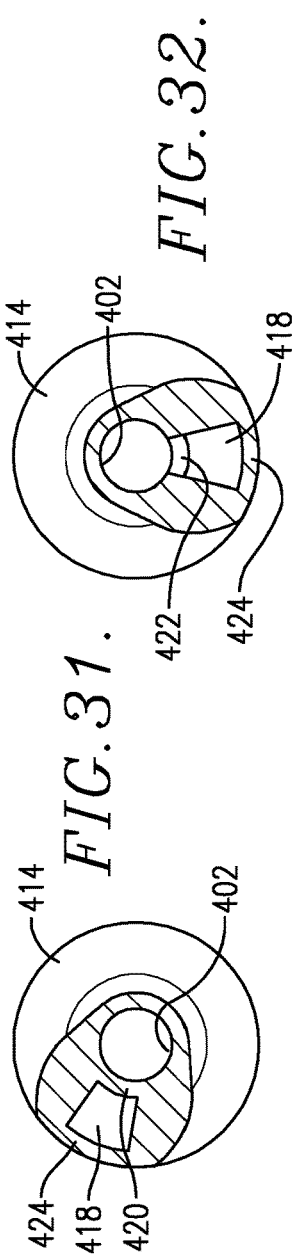
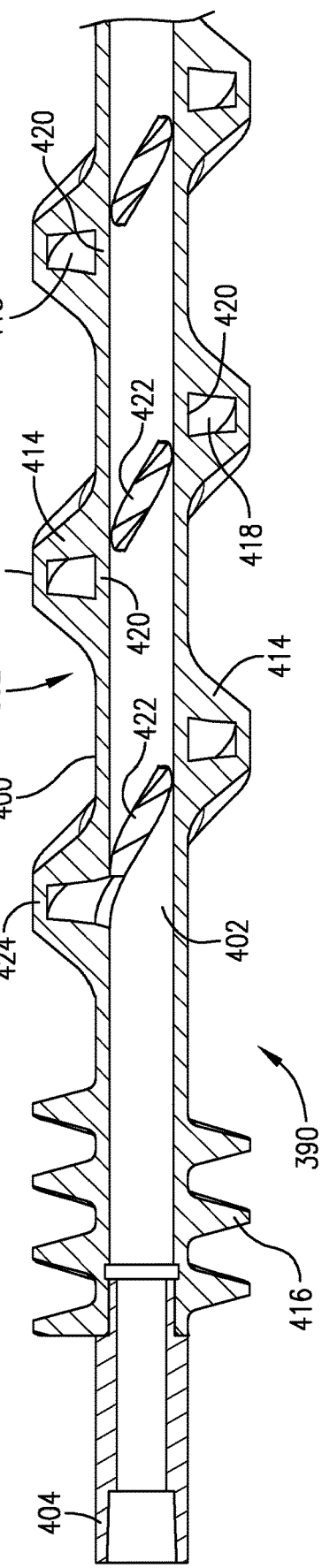
FIG. 29.
FIG. 31.
FIG. 32.
FIG. 30.

METHOD AND APPARATUS FOR PRODUCTION OF HIGH MEAT CONTENT PET FOODS

CROSS-REFERENCE TO RELATED APPLICATIONS

This application is a division of U.S. application Ser. No. 16/024,351 filed Jun. 29, 2018, which claims the benefit of provisional application Ser. 62/645,301 filed Mar. 20, 2018, and which is a continuation-in-part of U.S. application Ser. No. 15/840,926 filed Dec. 13, 2017, and which is a continuation-in-part of U.S. application Ser. No. 15/699,642 filed Sep. 8, 2017, all of which are incorporated by reference herein in their entireties.

BACKGROUND OF THE INVENTION

Field of the Invention

The present invention is broadly concerned with high-meat content extruded animal feeds such as pet feed products, having meat contents significantly higher than many prior art feeds. More particularly, the invention is concerned with such feeds, as well as methods of preparing the feeds, which preferably involve first dewatering conventional meat emulsions to produce low-moisture dewatered meat cakes, followed by extrusion of feed mixtures containing the meat cakes using a twin-screw hollow-core extruder permitting introduction of heat exchange media into the interior of the screws. In this fashion, the moisture content of the extrusion mixtures is maintained at a level permitting satisfactory extrusion, with sufficient inputs of specific mechanical energy and specific thermal energy to create acceptable extruded products.

Description of the Prior Art

Manufacturers of high-end pet feeds (especially dog feeds) desire to incorporate as much meat into their extruded products as possible. Pet owners increasingly favor high natural meat feeds, and such products command a premium price in the marketplace. These extruded feeds also typically include starch sources, minor ingredients such as vitamins and minerals, and a fiber source. Unfortunately, the meat source used, typically mechanically separated chicken or MSC, is a high moisture source (around 70% moisture); this, in turn, means that only relatively small amounts of MSC can be directly used, because in order to successfully extrude pet feeds, the total moisture content of the extrusion mixture usually cannot exceed around 48%, preferably no more than about 43%. Above these moisture levels, it is difficult or impossible to produce extruded feeds of acceptable quality. Hence, present-day meat-supplemented extruded pet feeds have a maximum meat content of around 40% by weight, based upon the total weight of the feed products taken as 100% by weight.

Prior art references dealing with meat-supplemented pet feeds include U.S. Pat. Nos. 4,040,768, 6,238,726, and 6,609,819; US Patent Publications Nos. 2012/0237642, 2016/0219904, and 2017/0013848; Foreign Patent Nos. CN105559118A, CN106418615A, CN205528350U, and CN206724651U; and Wenger Manufacturing PowerPoint Presentation entitled "Pet Food Extrusion."

SUMMARY OF THE INVENTION

The present invention overcomes the problems outlined above and provides extruded animal feed products comprising individual quantities of starch, fat, and meat, with the total meat content of the products including amounts of dewatered meat having a moisture content of from about 45-60% by weight, based upon the total weight of the dewatered meat taken as 100% by weight. In general, the total meat contents of the products are greater than about 40% by weight, and more preferably from about 40-60% by weight, based upon the total weights of the extruded products taken as 100% by weight. In turn, the total meat contents of the products should have dewatered meat amount of greater than 50% by weight, more preferably from about 50-100% by weight, based upon the total weights of the meat contents taken as 100% by weight. Most preferably, the meat contents of the products consist essentially of the dewatered meat.

In those instances where the total meat contents of the feeds include unprocessed meat emulsions or meat slurries, these should be present at a level of from about 1-50% by weight, based upon the total weight of the meat contents taken as 100% by weight. The unprocessed meat emulsion fractions in such cases are preferably emulsified poultry meats but can be any meat source commonly used in the industry.

The invention also provides methods for making an animal feed product comprising the steps of passing a mixture containing individual quantities of starch, fat, and meat into and through an extruder, and processing the mixture by extrusion through a restricted orifice die to create an extrudate; the meat contents of the final products are those discussed above.

The dewatered meat fractions of the extruded products are preferably prepared by passing a meat emulsion through a pair of counter-rotating, tapered, helically flighted, intermeshed screws. This dewatered meat is then directly used with the other recipe components and fed to a twin-screw extruder. The latter includes a pair of helically flighted, intermeshed, hollow core screws, and the method includes the step of directing a heating medium into the interior of the hollow core screws. The extrusion method is usually carried out without injection of moisture into the confines of the extruder.

BRIEF DESCRIPTION OF THE DRAWINGS

FIG. 3 is a side elevational view of the meat dewatering assembly;

FIG. 4 is a plan view of the meat dewatering assembly;

FIG. 5 is a top view of the meat dewatering assembly, with the screw housing removed to illustrate the configuration of the dual dewatering screws;

FIG. 7 is a sectional view illustrating the forward ends of the intermeshed screws of the meat dewatering assembly, illustrating the nip clearances between the flightings of the screws;

FIG. 8 is an enlarged top view illustrating one of the U-joint/adjustment collars forming a part of the meat dewatering assembly;

FIG. 9 is a perspective view of one of the U-joint/adjustment collars forming a part of the meat dewatering assembly;

FIG. 10 is an exploded view of one of the U-joint/adjustment collars forming a part of the meat dewatering assembly;

FIG. 13 is an exploded view of a modified housing employed in another embodiment of the invention and equipped with a first-section steam heater; and FIG. 14 is a fragmentary perspective view of the third housing section of the embodiment of FIG. 13, illustrating the pattern of drainage slots only on the bottom 180° of the housing section.

FIG. 17 is a fragmentary view with parts broken away of the forward outlet end of the device of FIG. 15, depicting the reverse flight sections of the twin screws;

FIG. 18 is a partial vertical section taken along line 18-18 of FIG. 19, illustrating the internal construction of the processing device;

FIG. 19 is a vertical sectional view taken along line 19-19 of FIG. 18;

FIG. 20 is a fragmentary view with parts broken away of the forward end of another twin-screw processing device in accordance with the invention, depicting the reverse flight sections of the twin screws;

FIG. 21 is a fragmentary view of the twin-screw assembly forming a part of the device of FIG. 20;

FIG. 22 is a sectional view of the device of FIG. 20, illustrating the full configuration of the twin-screw assembly thereof;

FIG. 23 is a vertical sectional view taken along line 23-23 of FIG. 22;

FIG. 24 is a partial sectional view illustrating the hollow shaft/hollow helix construction of the twin screws of the device of FIG. 15;

FIG. 25 is a fragmentary, perspective, exploded view illustrating the drive connection and steam diffuser forming a part of the twin-screw assembly of the FIG. 20 embodiment;

FIG. 26 is a perspective view of another hollow core screw embodiment in accordance with the invention;

FIG. 27 is a fragmentary elevational view of the screw of FIG. 26;

FIG. 28 is a fragmentary, vertical sectional view of the screw of FIG. 26, illustrating the internal construction thereof;

FIG. 29 is a fragmentary, enlarged cross-sectional view of the screw of FIG. 26;

FIG. 30 is another fragmentary, enlarged cross-sectional view of the screw of FIG. 26;

FIG. 31 is a vertical sectional view taken along the line 31-31 of FIG. 28;

FIG. 32 is a vertical sectional view taken along the line 32-32 of FIG. 28; and

While the drawings do not necessarily provide exact dimensions or tolerances for the illustrated components or structures, FIGS. 1-32 are to scale with respect to the relationships between the components of the structures illustrated therein.

DETAILED DESCRIPTION OF THE PREFERRED EMBODIMENT

The Meat Dewatering Assembly

Figure 1:
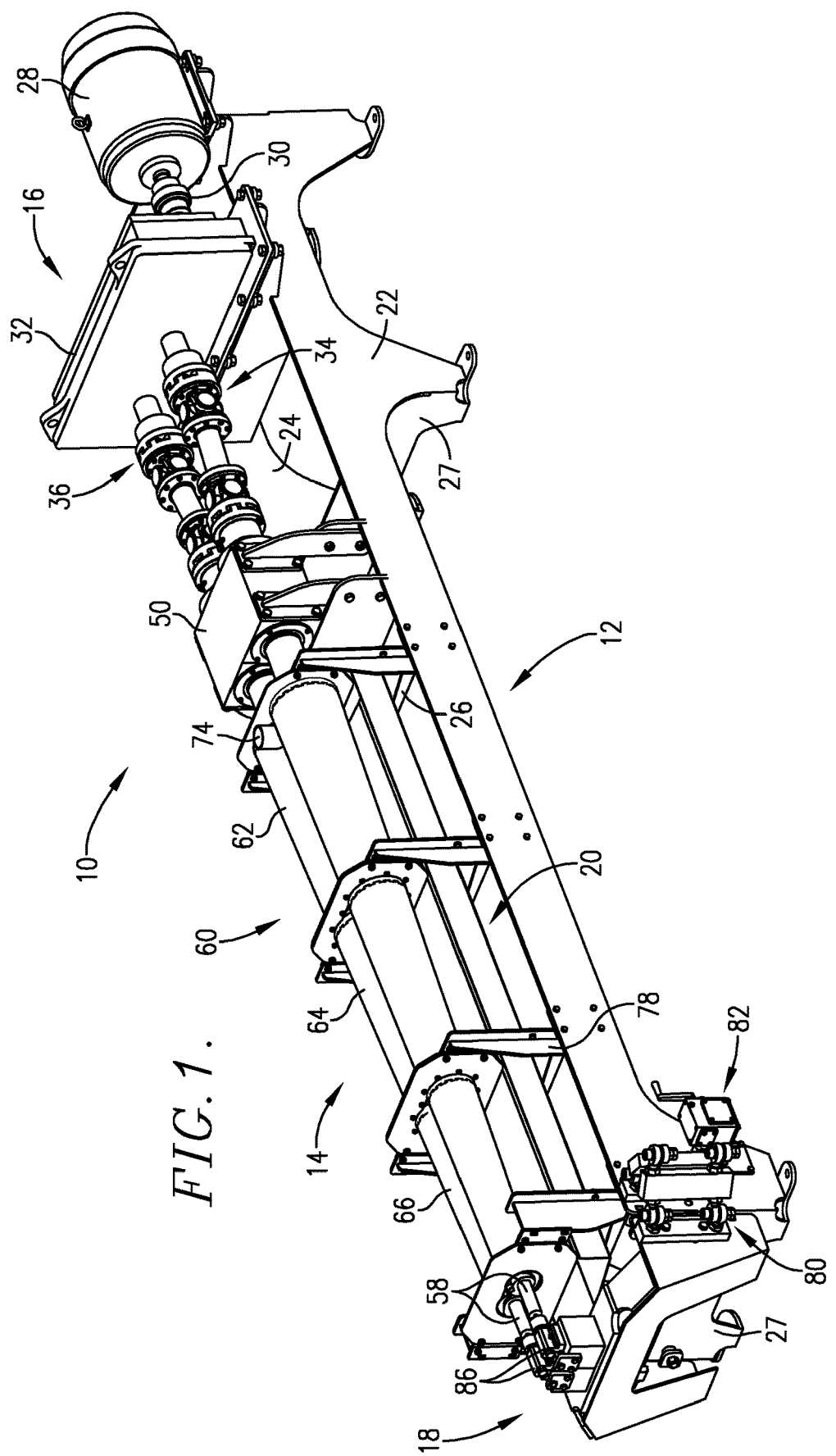
FIG. 1 is a perspective view of a meat dewatering assembly in accordance with the invention.
Figure 2:
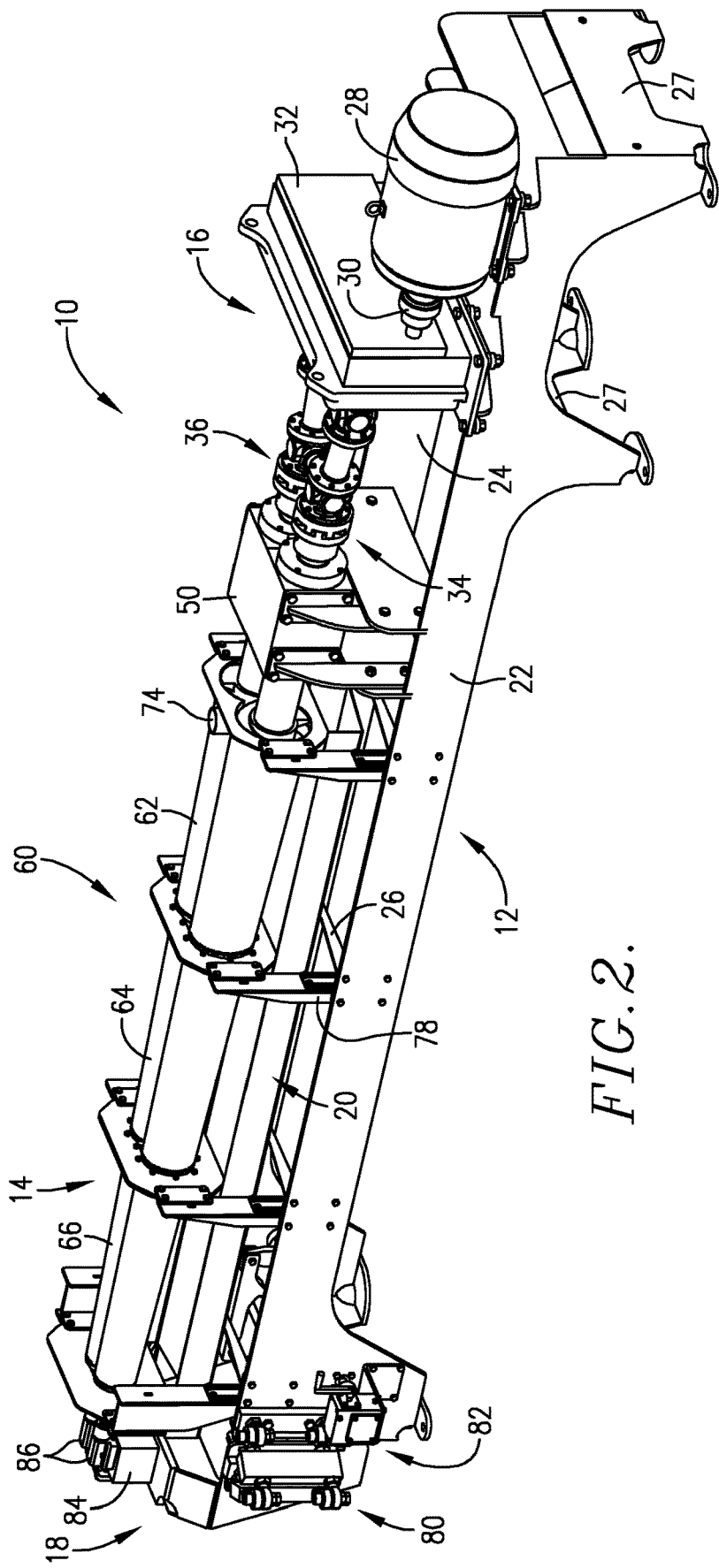
FIG. 2 is another perspective view of the meat dewatering assembly, from a different viewing angle.

Turning first to FIGS. 1-4, a meat dewatering assembly 10 is depicted, which generally includes an elongated bottom support frame 12, a twin-screw dewatering unit 14, a drive assembly 16 operably coupled with unit 14, an endmost, swingable screw support 18, and a water collection trough 20. As illustrated, the frame 12 supports all of the foregoing components in an in-line manner, from right to left, as viewed in FIGS. 1, 3, and 4.

In more detail, the support frame 12 has elongated, laterally spaced apart side members 22, 24, with intermediate connection structure 26 and spanning walls 27 extending between and interconnecting the side members. The drive assembly 16 includes an electric drive motor 28 having an output shaft 30 leading to gearbox 32. The gearbox 32 has a pair of output shaft assemblies 34, 36, each including a first adjustment collar 38, a first interconnected U-joint 40, a short output shaft 42 from the first U-joint 40 to a second U-joint 44, and a second adjustable collar 46.

The dewatering unit 14 includes a pair of uniformly tapered, non-parallel, intermeshed, helically flighted screws 52 and 54 each having a central flighted region 55, rearwardly extending drive section 56 extending into and supported within bearing housing 50, and forwardly extending stub shafts 58. As illustrated, the drive section 56 extends through the bearing housing 50 and is secured to adjustable collar 46. In the illustrated embodiment, the center lines of the screws 52, 54 have an included angle of 2° therebetween; more broadly, this angle would be from about 1-7°, more preferably from about 1-5°. Greater included angles of 10° or more would tend to degrade the performance of the assembly 10 by creating unduly high nip pressure conditions at the nip regions between the screws. The regions 55 of the screws 52, 54 are of single flight design, with a uniformly decreasing pitch length from rear to front, and a uniformly varying flight depth from rear to front. The screw 52 is a left-hand lead, variable lead (from 3.937 in. at the rear end to 2.520 in. at the forward end), variable depth screw, whereas the screw 54 is a right-hand lead, variable pitch, variable depth screw having the same lead dimensions. Pinch points or nip clearances 59 are provided between the intermeshed flights along the length of the screws, which are adjustable in length. Importantly, the screws are designed and powered to rotate in a counter-rotating fashion, i.e., they rotate in opposite clock directions.

The nip clearances 59 between the intermeshed fighting of the screws 52, 54 (see FIG. 7) can be varied using the adjustment structure described below between 0 and 0.161 inches at the large diameter ends of the screws, and from 0 to 0.086 inches at the small diameter ends of the screws. In alternate designs, multiple helix screws may be used in lieu of the screws 52, 54, or the screws could be of constant lead or constant pitch.

Figure 6:
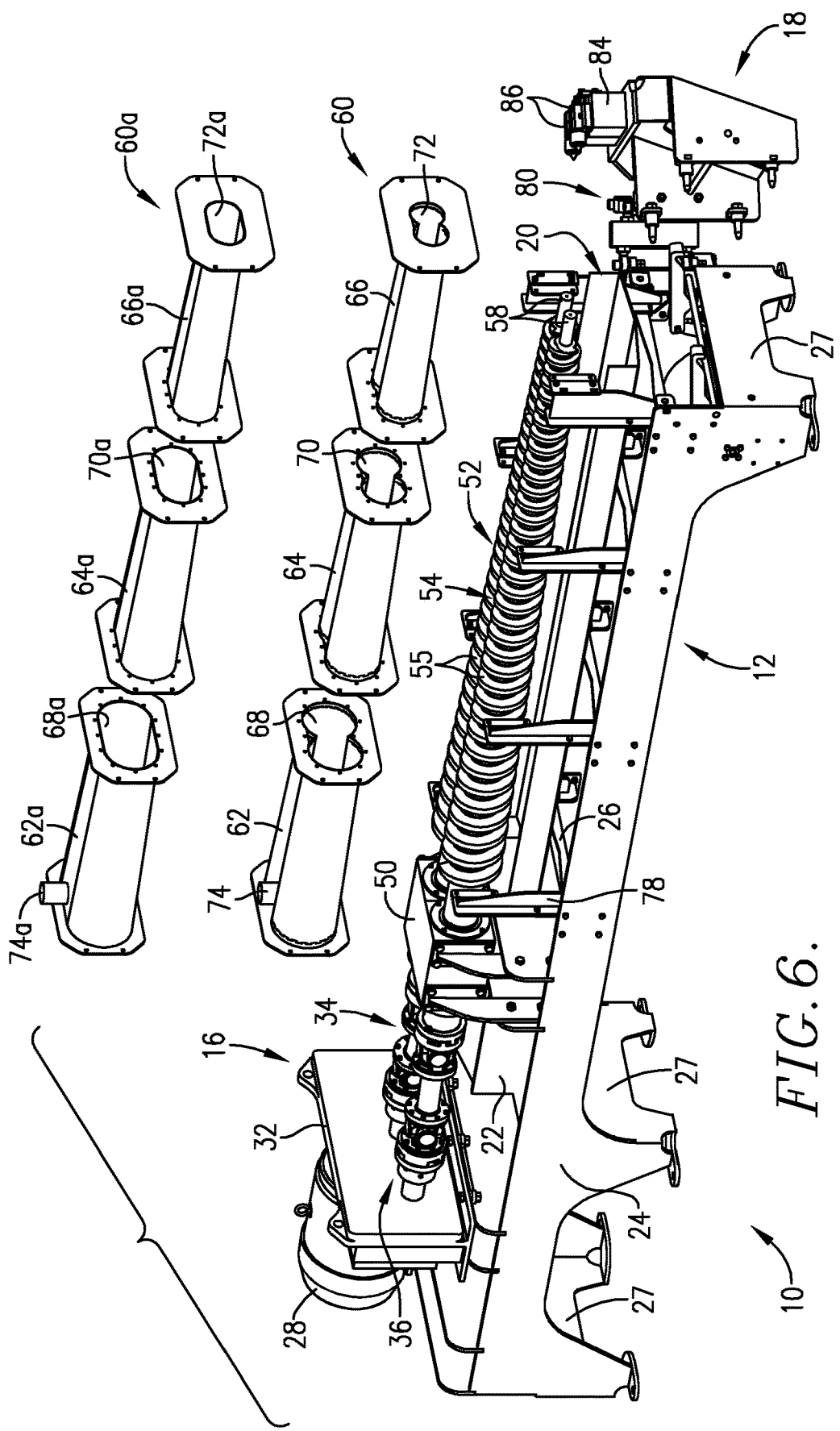
FIG. 6 is a perspective exploded view of the meat dewatering assembly, illustrating alternate housing assemblies and the endmost screw support frame in its open position.
Figure 11:
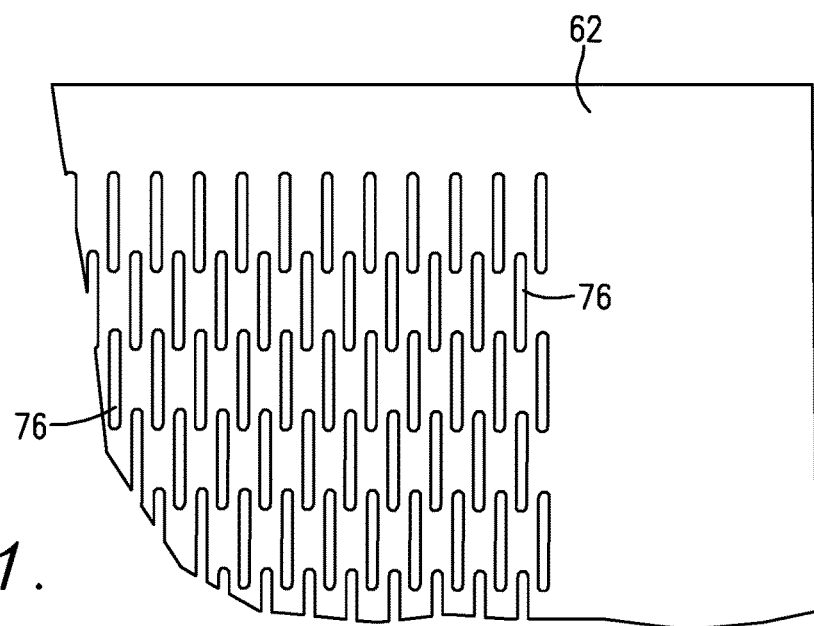
FIG. 11 is a fragmentary view illustrating the water expression slots in the housing of the meat dewatering assembly.
Figure 12:
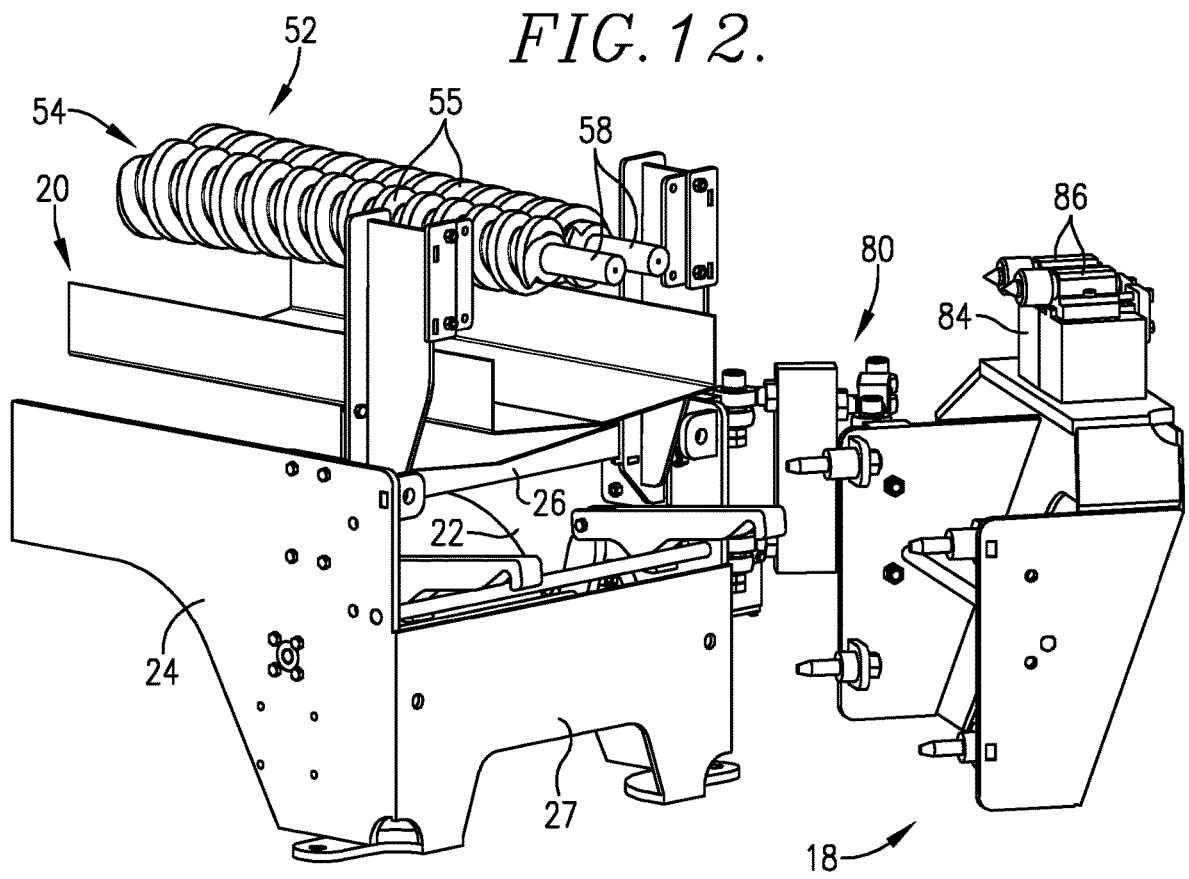
FIG. 12 is an enlarged view similar to that of FIG. 6, but illustrating in detail the swing frame screw support of the meat dewatering assembly.
Figure 15:
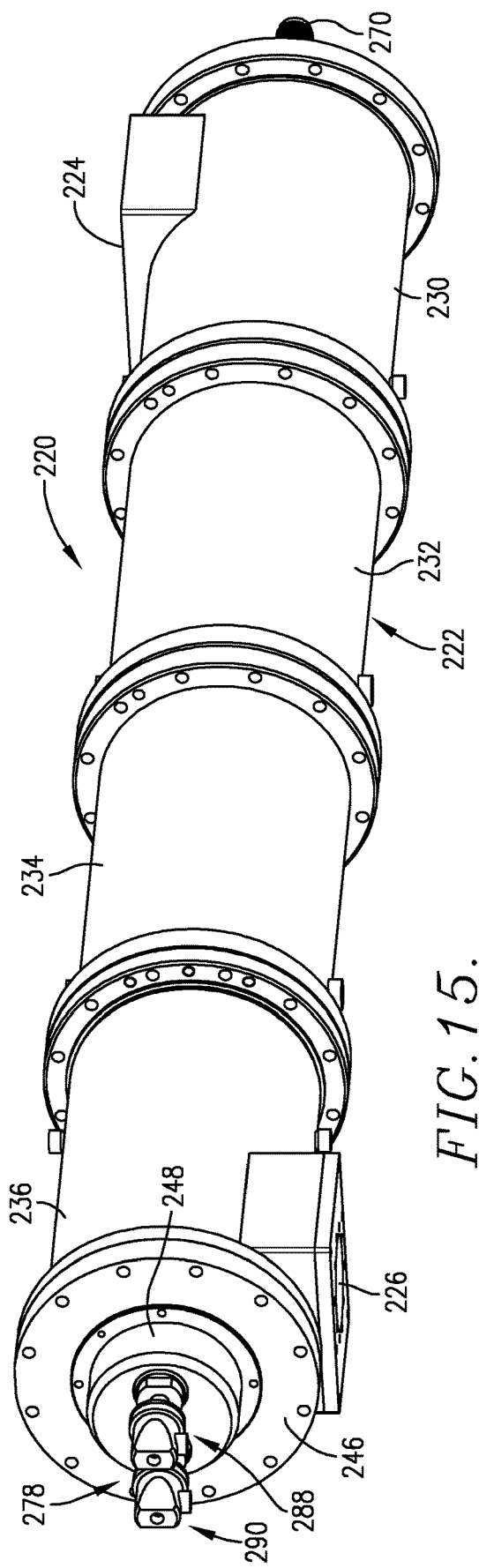
FIG. 15 is a perspective view of a twin-screw processing device in accordance with the invention.

The overall unit 14 also includes a perforated, open-ended housing assembly 60, which receives the screws 52, 54, with the drive section 56 extending rearwardly from the housing, and the stub shafts 58 extending forwardly therefrom. As best seen in FIG. 6, the housing assembly 60 is made up of three end-to-end interconnected and tapered sections 62, 64, 66, with each having an internal bore 68, 70, 72 of somewhat "figure-8" configuration so as to closely surround the intercalated screws 52, 54, i.e., the housing presents two elongated, side-by-side, communicating chambers, each surrounding and receiving a corresponding screw 52 or 54. The rearmost housing section 62 is equipped with a tubular meat inlet 74. The sections 62-66 have a series of elongated, water drainage slots 76 formed therein. In this embodiment, the slots 76 in section 62 are 1 mm in width and 9 mm in length; the slots 76 in the downstream sections 64 and 66 are smaller, with the slots of section 64 greater than those of section 66. Also, in the embodiments of FIGS. 1-12, the slots 76 are provided about the entirety of the housing 60 and along the full length thereof. As best seen in FIGS. 1 and 3, a series of upright mounts 78 are secured to the side members 22, 24, and extend upwardly for connection to the housing sections, thereby suspending the housing 60 above the support frame 12. The open housing design ensures that the meat dewatering operation of the assembly 10 occurs at substantially atmospheric pressures in contrast to typical extruders which normally operate at superatmospheric pressures.

As depicted in FIG. 6, use may be made of an alternate housing assembly 60*a*, which is identical to the assembly 60 except that the bores 68*a*, 70*a*, and 72*a* have essentially flat intermediate sections and rounded ends. Consequently, the walls of the housing sections 62*a*, 64*a*, and 66*a* do not closely conform to the configuration of the screws 52, 54 at the intermeshed regions thereof.

The swingable screw support 18 is mounted to the forward end of support frame 12 by means of a pivot assembly 80, allowing the support 18 to be selectively moved from a closed position, illustrated in FIGS. 1-5, to an open position, illustrated in FIG. 6. Appropriate latching structure (see FIGS. 6 and 12) is provided to hold the support 18 in its closed position, with an attach/detach crank 82. When it is desired to open the support, the crank 82 is actuated, and the support is swung outwardly to the FIG. 6 position. The support 18 is provided with a fixture 84 having a pair of side-by-side bearing supports 86, which receive the forwardly projecting stub shafts 58 of the screw 52, 54; thus, the screws are supported at both ends thereof during operation of the assembly 10.

The water collection trough 20 positioned under housing 60 is of generally U-shaped configuration and is designed to receive water expressed through the housing slots 76. Suitable water take-away structure (not shown) is provided for draining of the trough 20 during operation of the assembly 10.

As indicated previously, the nip clearances between the screws 52, 54 can be varied. In order to do this, use is made of one or more of the adjustment collars 38. Referring to FIGS. 8-10, the adjustment collar/U-joint 46/44 is illustrated. Specifically, the rearmost end of drive section 56 of screw 54 is secured to the collar 46. The collar 46 has a first radially expanded segment 88 having a pair of opposed lugs 90. The collar 46 also has a second segment 92 having a pair of opposed lug-receiving recesses 94. The segment 92 is secured to U-joint 44 by means of screws 96. The recesses 94 are defined by a pair of projections 98, each carrying an adjustment screw 100; the screws 100 engage the lugs 90 as shown. When it is desired to change the relative position of the screw 54 relative to the screw 52, and thereby change the nip clearances therebetween, it is only necessary to turn one of the adjustment screws 100, which affects a slight rotation of the collar 46, and thereby the entirety of the screw 54. Of course, such adjustments can only be made when the assembly 10 is not in operation.

FIG. 13 illustrates a modified embodiment in the form of a meat dewatering assembly 102. In this embodiment, a screw assembly housing 104 is provided made up of first, second, and third end-to-end interconnected housing sections 106, 108, and 110. The initial housing section 106 is equipped with a surrounding steam-heating jacket 112, which serves to heat the emulsified meat introduced through the inlet 114. Moreover, in this embodiment, the intermediate housing section 108 is equipped with water-drainage slots 76, which cover the full surface area of the section 108. The final section 110 has slots 76 only on the bottom half thereof, as best seen in FIG. 14.

It is desirable that meat to be processed in the assembly 10 be first mechanically conditioned into an emulsified form, which may be optionally preheated to a temperature of from about 40-80° C., before delivery to the inlet 74. The meat then passes along the length of the housing 60 during counter-rotation of the screws 52, 54, the latter powered by means of drive assembly 16. As the meat traverses the length of the housing at substantially atmospheric pressures, the intermeshed screws serve to press or squeeze the meat particles within the emulsified meat, to thereby expel water through the housing slots 76 for collection within and take-away from trough 20. The fully dewatered meat then passes through the open forward end of the housing 60 where it is collected, by a suitable conveyor or other apparatus (not shown) separately from the expressed water. In normal practice, the screws 52, 54 are counter-rotated at a speed of from about 30-200 rpm, more preferably 50-150 rpm, which differs from typical twin-screw extruders equipped with high rotational speed, co-rotating screws.

The Hollow Core Screw Extruder

Turning now to the drawings, and particularly FIGS. 15-19, a processing device 220 is illustrated. Broadly speaking, the device 220 includes an elongated, tubular barrel 222 having a material inlet 224 and an opposed processed material outlet 226, with a twin-screw assembly 228 within the barrel 222.

As illustrated, the barrel is made up of a plurality of end-to-end interconnected barrel sections 230, 232, 234, and 236. An internal liner assembly 238 is located within and extends along the length of the sections 230-236 and presents a pair of elongated, juxtaposed communicating arcuate passageways 240, 242, which receive the twin-screw assembly 228. The sleeve further presents the rearmost opening 244, as best seen in FIG. 18. An apertured front wall 246 is located at the opposite end of the barrel and is secured thereto. Additionally, a forwardly projecting bearing housing 248 is attached to the outer face of front wall 246, and has a pair of side-by-side tubular bearings therein.

Figure 16:
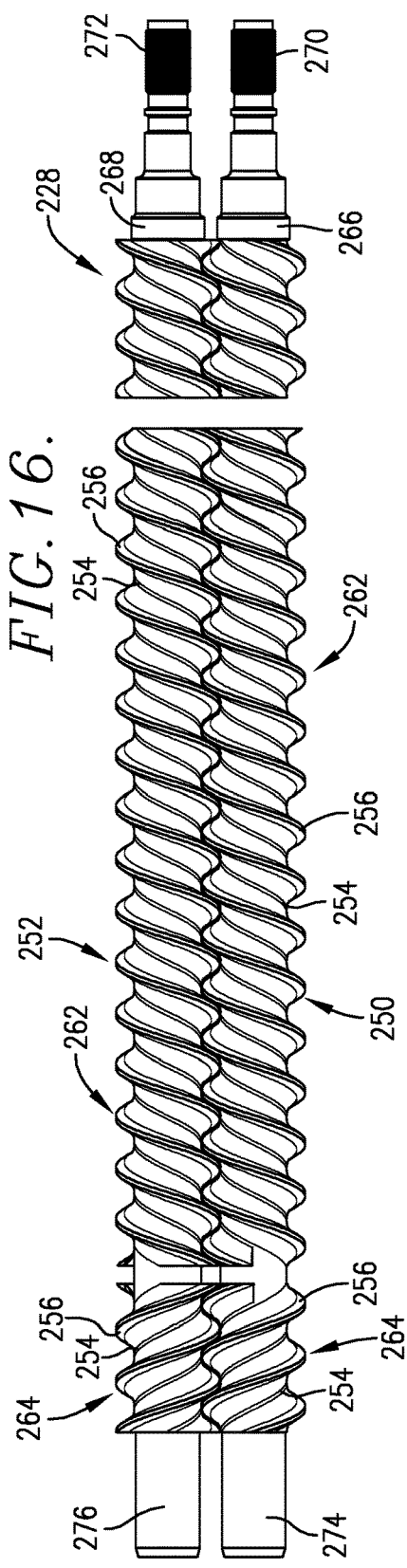
FIG. 16 is a fragmentary view of the twin-screw assembly forming a part of the device of FIG. 15.

The twin-screw assembly 228 includes identical, complemental first and second intermeshing, double-flight screws 250 and 252, which are designed to directionally co-rotate during the operation of device 220. Referring to FIGS. 16 and 18, it will be seen that the screws 250, 252 each have an elongated shaft 254 with outwardly extending, helical fighting 256 along the length of the shaft 254, having a pitch length of 1, based upon the screw diameter. An elongated central bore 258 extends substantially throughout the length of the shaft 254, thereby creating a hollow core 260 therein. As best seen in FIG. 17, the fighting 256 is divided into two sections, namely a first section 262 operable to convey material from the inlet 224 toward and through the processed material outlet 226, and a second section 264 operable to retard the flow of material therepast. To this end, the flighting sections 262, 264 are of reverse hand, respectively. The rearmost ends of the screws 250, 252 are provided with drive and bearing structure 266, 268, having rearmost, splined connector ends 270, 272; the ends 270, 272 are designed to mate with suitable drive structure (not shown) for axially rotating the screws. The forward ends of the screws are equipped with elongated extensions 274, 276, which are received within the tubular bearings of housing 248 (FIG. 17).

The screws 250, 252 are equipped with structure 278 to supply heat exchange media to the internal cores thereof. Specifically, elongated, stationary steam delivery tubes 280 and 282 extend from a point outside of housing 222 adjacent front wall 246 and into the bores 258. The tubes 280, 282 extend through the endmost tubular fixtures 284, 286 located at the forward ends of the extensions 274, 276. The outermost ends of the tubes 280, 282 connect with identical rotary unions 288, 290. Each such union includes a block 292 having a media inlet opening 294, a liquid removal outlet 296, and a rotatable sleeve 298 disposed about the corresponding tube 280 or 282. To this end, the sleeves 298 are secured to the corresponding tubular fixtures 284, 286.

The screws 250, 252 are preferably fabricated from metal using normal machining techniques and are normally case-hardened.

In operation, material to be processed (which may be preconditioned, as explained hereafter) is delivered to inlet 224 during co-rotation of the screws 250, 252, which serves to advance the material during processing thereof to deliver processed material to outlet 226. During this operation, heat exchange media (normally steam) is directed from a delivery conduit (not shown) coupled with the media inlets 294 and into the tubes 280, 282 to the open cores 260 of the screws in order to provide thermal energy required for processing of the material. Additional energy input is provided by means of pressure and shear conditions developed within the barrel 222. During processing, steam condensate passes from the cores 260 and through the sleeves 298, exiting the system via the removal outlets 296. In order to prevent leakage of material past the wall 246 and the fixtures 284, 286, the reverse flight section 264 comes into play by creating a retardation force against the flow of material created by the opposite hand fighting of the section 262. The product emerging from the outlet 226 may then be passed through a restricted orifice extrusion die and cut, in order to form the final product, although in practice, the elongated delivery pipe is normally secured to the outlet 226 and a final die and knife assembly are located at the opposite end of the pipe.

FIGS. 20-25 illustrate another embodiment of the invention, in the form of a processing device 300. The device 300 is in many respects similar to the device 220, having a tubular barrel 302 with a twin-screw assembly 304 therein, and having an inlet 224 and an outlet 226, as in the case of the first embodiment. Again, the barrel 302 is made up of tubular, interconnected barrel sections 306-312 with an internal liner assembly 314 defining side-by-side passageways 316, 318. The forward end of barrel 302 is equipped with a front wall 320, which supports a forwardly projecting bearing housing 322.

The screw assembly 304 has a pair of identical, intermeshed, single flight, helical screws 324, 326, which are received within the passageways 316, 318. Each of the screws has an elongated central shaft 328, 330, as well as outwardly extending helical flighting 332, 334 along the length thereof. As in the case of the first embodiment, the screws 324, 326 have rearmost drive and bearing structures 336, 338, equipped with splined drive connection ends 340, 342. The forward ends of the screws have bearing extensions 344, 346, which are received within the bearings of housing 322.

The principal differences between the first and second embodiments are the configuration of the helical screws 324 and 326. Specifically, each such screw includes a primary central section 348 operable to move product along the length of the barrel 302 towards and through the outlet 226, an inlet section 350 operable to deliver incoming material to the section 348, and a forward, material flow retarding section 352. The inlet section 350 is advantageously a machined part having a central shaft 354 with an internally splined bore 356, and outwardly extending fighting 332, 334. As best seen in FIG. 24, the bore 356 is designed to receive the forward end of the corresponding drive and bearing structure 336, 338. The screw sections 348 and 350 have a pitch length of 1, based upon the screw diameter, and denoted by D1 of FIG. 24. The forward section 352 of each screw is likewise a machined part and has a central, bored shaft 360 with outwardly extending helical flighting 362. Notably, the pitch of the flight 362 is opposite that of the pitch of the flighting 358 of screw section 348, and has a pitch length of 0.3, based upon the screw diameter, denoted by D2 of FIG. 24. Preferably, the pitch length D1 should be from about 0.4-1.2, more preferably 0.5-1.0, whereas the pitch length D2 should be from about 0.2-1.1, more preferably 0.3-1.

The central section 348 is preferably formed by casting (e.g., sand or investment casting) with a plurality of sections which are butt-welded together to form the entirety of the central section. As best seen in FIG. 24, the central section 348 has a central shaft 366, which is hollow along the length thereof to define a central core 367, as well as outwardly extending flighting 368, which is likewise hollow to define a helical core 369. In this regard, the flight 368 is defined by outwardly extending, opposed, spaced apart sidewalls 370 and 372, with a flattened outer wall 374. As such, it will be observed that there is a helical transition 376 between the innermost ends of the sidewalls 370, 372, which provides full, open communication between the central core 367 and the helical core 369, without any blockage or narrowing whatsoever; stated otherwise, the transition 376 presents an area which is open throughout the length and width thereof in order to afford unobstructed communication between the hollow regions of the shaft and helical screw. Inasmuch as the section 348 is of cast construction, it will be seen that the thickness of the shaft 366 is essentially identical with the thicknesses of the sidewalls 370, 372, and outer wall 374. In preferred forms, the length of the central screw section 348 is at least about three times, more preferably at least about five times, greater than the length of the forward screw section 352. The screws 324, 326 receive elongated media delivery tubes 378, 380, which are designed to deliver media such as steam to the interior of the screw sections 348 and 352. The forward ends of the tubes 378, 380 are received within rotary unions 288, 290, identical to those described in connection with the first embodiment, and like reference numerals have been applied (FIG. 24). The rotatable sleeves 298 are supported by couplers 284, again as described in the first embodiment.

The innermost ends of the tubes 378, 380 are each supported by a tubular, open-sided diffusion cage 382. The latter includes a mounting screw 384, which extends through the end of the primary screw section 348 and is received within a threaded bore 386 in the forward butt end of bearing and drive structure 336.

The rearmost end of the screw section 348 has a splined portion 388, which receives the forward end of the structure 336 ahead of inlet screw section 350. The forward end of the screw section 348 is secured to the rearward end of screw section 352 by butt welding or any other appropriate technique. Hence, driving rotation of the structures 336 serves to rotate the entire screws 324, 326.

The operation of device 300 is similar to the device 220. However, owing to the completely open hollow core structure of the screw section 348, better heat transfer from the injected steam is afforded, as compared with the device 220.

FIGS. 26-32 illustrate another hollow core screw embodiment of the invention in the form of helical extrusion screw 390. The screw 390 is designed for use in a twin-screw extruder so that a mating screw (not shown) will be used in conjunction with the screw 390 to make a screw set. Generally, the screw 390 includes an elongated central shaft 392 with a continuous helical flighting 394 along the length thereof.

The shaft 392 has a rearmost splined section 396 to afford a driving connection with a motor/gear reducer assembly and a forward bearing extension. The shaft 392 is a machined, case-hardened part and has a solid rear section 398 and a hollow core forward section 400 presenting an elongated, axially extending, central core 402. The forward end of the core 402 is equipped with a coupler 404 designed to receive a rotary union 288 (FIG. 28). A stationary steam delivery tube 408 (shown fragmentarily in FIG. 28) extends substantially the full length of the core 402 and has an open end 410.

The fighting 394 includes a rear section 412 of relatively narrow flight width, which extends the full length of the solid section 398. Additionally, the fighting 394 has a wider flight width forward section 414 presenting an outermost flight surface 414a, which extends from the end of section 412 to a point close to the forward end of the shaft 392. However, as in the case of the earlier embodiments, the screw 390 has a reverse flight section 416 between the end of section 414 and coupler 404.

In the manufacture of the screw 390, the fighting 394 is machined as a solid protrusion from the shaft 392, with a continuous, helical, open-top groove 418 in the wide flight section 414, extending from the outermost flight surface 414a inwardly to an inner wall 420 close to the core 402. Thereafter, a series of spaced apart apertures 422 are formed along the length of the inner wall 420, in order to communicate the core 402 with groove 418. Next, a helical cover piece 424 is positioned over the upper end of the groove 418, and is welded to the fighting section 414. In the final step, the screw 390 is machined to provide the proper outside diameter for the flighting 394. This creates a unitary construction, as illustrated in the drawings.

The operation of the screw 390, with its mating, intermeshed screw within an extruder barrel, such as barrel 222, is the same as described in connection with the embodiment of FIGS. 15-19. That is, co-rotation of the screw set serves to advance material during processing thereof from the barrel inlet to the barrel outlet. Simultaneously, steam or other heat exchange media is directed into the core 402 through the union 288 and the extension of shaft 392 beyond the end of the extruder barrel. This media flows through the core 402 and groove 418 owing to the communicating apertures 422. This provides an increased level of thermal energy to the process. The reverse flight section 416 also serves to retard the flow of material at the forward end of the screw 390.

Figure 33:
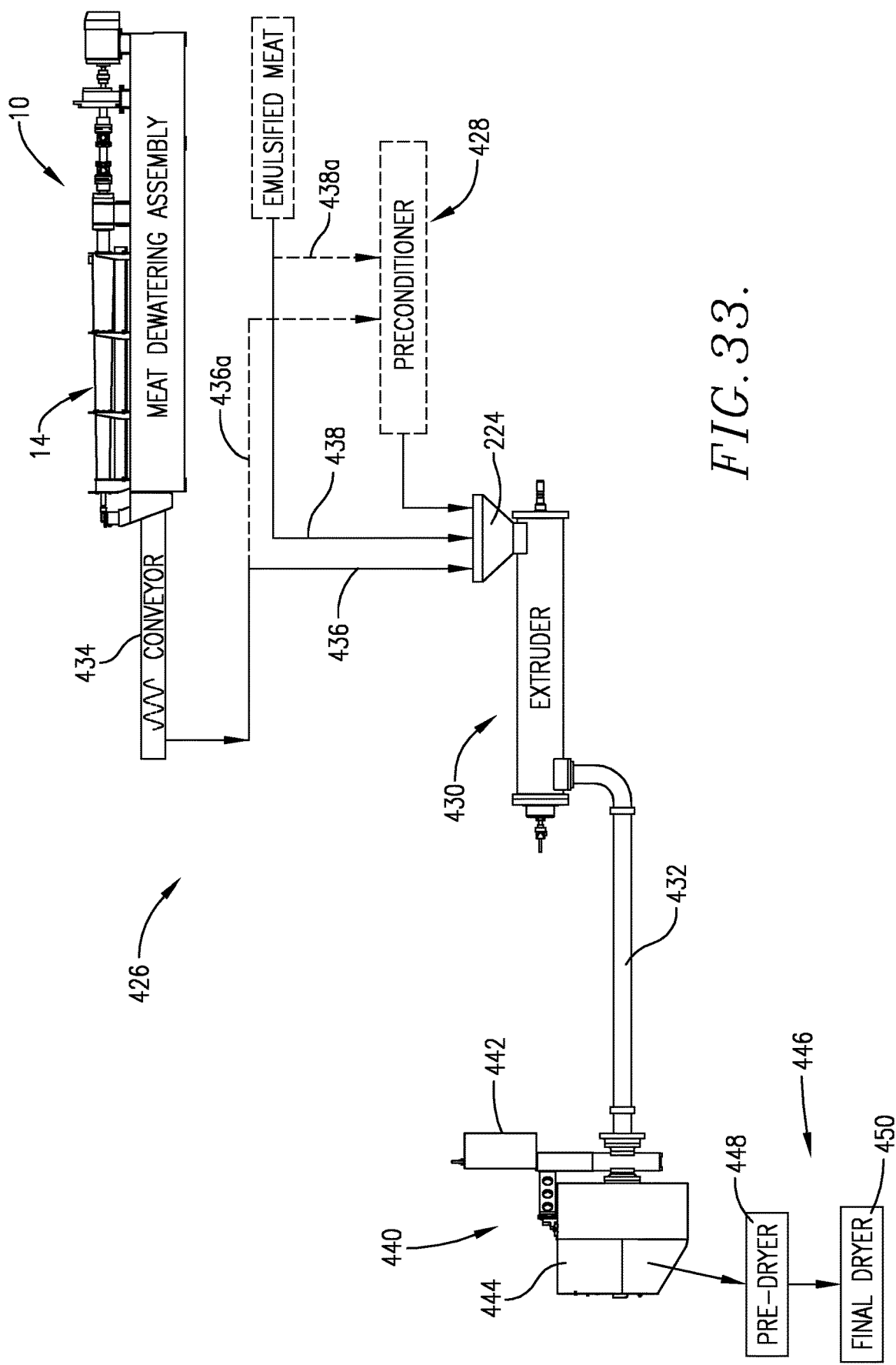
FIG. 33 is a schematic view illustrating a processing system in accordance with the invention for the production of high-meat content pet foods.

FIG. 33 schematically illustrates a system 426 for the production of high-meat content pet foods, and broadly includes an upstream meat dewatering assembly 10 operably coupled with an extrusion system generally having an optional preconditioner 428, an extruder 430, and a post-extrusion terminal assembly 440 including a drying assembly 446. The extruder 430 is a modified version of the devices 220 or 300, using any of the hollow core screws described above. The extruder 430 includes a generally L-shaped conduit or pipe 432 affixed to barrel outlet 226 and extending to the terminal assembly 440. The use of pipe 432 permits attachment of steam lines to the previously described rotary unions 288, 290 (FIG. 20).

The meat dewatering assembly is designed to treat high-moisture meat products, such as emulsified poultry (e.g., chicken or turkey) products to substantially reduce the moisture levels thereof and create low-moisture meat cakes. Such emulsified products typically contain from about 60-80% by weight moisture, and treatment in the assembly 10 serves to reduce the moisture content such that the final meat cakes usually have a moisture content of from about 45-60% by weight, more preferably from about 48-55% by weight, based upon the total weight of the dewatered meat taken as 100% by weight.

The system 426 in further detail includes a conveyor 434 and dewatered meat cake delivery line 436 leading to the input 224 of the extruder 430. In some cases, it may be desirable to use emulsified meat along with dewatered meat cake and, to this end, an optional emulsified meat inlet line 438 is provided, which leads to extruder input 224. If desired, the preconditioner 428 may be used, and in such a case the meat inlet lines 436a, 438a would direct the meat products through the preconditioner 428 before entering the extruder inlet 224. In preferred practice, the preconditioner 428 is operated without any injection of moisture by way of steam or water, and thus the preconditioner would principally serve as a means of uniformly mixing the ingredients to be processed in the extruder 430.

As noted, the output end of pipe 432 is operably coupled to a terminal assembly 440 made up of an adjustable back pressure valve 442 and an extrudate hood 444, with a restricted orifice die (not shown) located at the entrance to the hood 444. These components are fully illustrated and described in U.S. Pat. No. 9,320,298, which is incorporated by reference herein in its entirety. The valve 442 is designed to provide a selective degree of restriction of flow of material from pipe 432 as the material passes through the endmost die. The extrudate hood 444 serves to facilitate the spread of extrudate issuing from the die to prevent agglomeration or clumping of the extrudate. The hood 444 includes a shiftable conveyor belt (not shown), in order to move the product from the die area to the hood exit.

The dryer assembly 446 is made up of a relatively short pre-dryer 448 and a final dryer 450 of conventional design. In some instances, it has been found that high-meat extrudates issuing from the die are delicate and prone to fragmentation. Accordingly, in these case, the extrudate from the hood 444 passes immediately into the pre-dryer, which serves to "set" the products and preserve the integrity thereof, prior to passage to the final dryer.

The system 426 is designed to produce extruded products using mixtures of meat including dewatered meat, with the optional presence of full-moisture meat or meat emulsion, together with other conventional pet food ingredients such as grains, starches, and fats, with optional minor ingredients such as vitamins and emulsifiers.

In general, the products should contain from about 5-50% by weight starch, from about 3-12% by weight fat, and a preferred moisture content of from about 6-12% by weight, all of the foregoing percentages based upon the total weight of the product taken as 100% by weight.

The total meat content can consist essentially of dewatered meat, or a mixture of such dewatered meat with whole meat and/or meat emulsion(s). Where the total meat content is made up of a combination of dewatered meat and other meat sources such as emulsified meat, the dewatered meat should be present at a level of from about 50-100% by weight, more preferably from about 85-100% by weight, based upon the total weight of the meat content taken as 100% by weight; correspondingly, the meat emulsion, if used, should be present at a level of from about 0-50% by weight, more preferably from about 1-15% by weight, again based upon the total weight of the meat content taken as 100% by weight.

Advantageously, the total meat content of the products consists essentially of dewatered meat, because adding untreated meat or meat slurry emulsions increases the moisture content of the mixture to be extruded, which is to be avoided.

In all cases, whether the total meat content is made up entirely of dewatered meat or a combination of dewatered meat and untreated meat emulsion and/or meat slurry, it is important to understand the basis for determining the meat content of the products. For example, (1) the total meat content may be expressed as a percentage of the dry recipe components, i.e., the dry components are taken as 100% by weight; or (2) the total meat content may be expressed as a percentage of the total recipe, i.e., the total recipe including the total meat content is taken as 100% by weight; or (3), similar to (1), the total meat content may be expressed as an equivalent meat slurry level, i.e., as if the total meat content were present as meat slurry, with the meat slurry level expressed as a percentage of the total dry recipe components; or (4), similar to (2), the equivalent meat slurry level may be expressed as a percentage of the total recipe components taken as 100% by weight. From a commercial perspective, current labeling laws and regulations allow the pet food manufacturer to advantageously express the meat content as in (4).

The following Table 1 sets forth approximate broad and preferred ranges in the case where the meat content is entirely in the form of dewatered meat and expresses those ranges as set forth in (1)-(4) above. It should be understood in this respect that the data in columns (3) and (4) are, correspondingly, the values of columns (1) and (2) multiplied by 3.33; this reflects the fact that each pound of dewatered meat was made from 3.33 pounds of starting meat slurry. Moreover, the values of column (2) are equal to the values of column (1) divided by the values of column (1) plus 100, and the values of column (4) are equal to the values of column (3) divided by the values of column (3) plus 100.

TABLE 1

| Process Range | (1) Dewatered meat expressed as % of the dry recipe components | (2) Dewatered meat expressed as % of the total recipe components | (3) Equivalent meat slurry level expressed as % of dry recipe components | (4) Equivalent meat slurry level expressed as % of the total recipe components |
|---|---|---|---|---|
| Broad range | 85.0-120.0 | 46.0-54.5 | 156.0-400.0 | 60.9-80.0 |
| Preferred range | 85.0-105.0 | 46.0-51.2 | 156.0-350.0 | 60.9-77.8 |

The above Table 1 represents preferred implementations of the invention wherein the total meat content is in the form of dewatered meat. If the total meat content includes untreated meat emulsion or meat slurry, such will normally reduce the total meat content which can be employed in the products, inasmuch as meat or meat slurry will have a greater moisture content than the dewatered meat. As noted above, the total moisture content of the mixture fed to the extruder is important, in order to permit proper extrusion processing of the mixture. Typically, this moisture content should be from about 25-48% by weight, more preferably from about 35-43% by weight, based upon the total weight of the mixture fed to the extruder taken as 100% by weight.

During extrusion processing, the ingredients passing through the extruder should be heated to a minimum temperature of 70° C., or more preferably ≥90° C., in order to meet feed safety requirements. The rotation of the extruder twin screws should be in the range from about 100-600 rpm, more preferably from about 300-450 rpm; pressure within the extruder barrel is normally from about 200-600 psi, more preferably from about 300-400 psi. Pressurized steam is directed into the hollow core screws usually at a level of 30-120 psi, more preferably from about 45-90 psi, depending upon the size of the extruder. Although not illustrated in the drawings, it is possible to employ extruder barrels which are externally jacketed for receiving steam or other heat exchange media in order to indirectly heat the materials passing through the extruder. The jacket steam would likewise be pressurized to a level of about 30-120 psi, more preferably from about 45-90 psi.

In the drying assembly 446, the pre-dryer 448 is of multiple-pass design and employs heated air at a temperature of from about 100-240° C., more preferably from about 140-180° C., with a total retention time of from about 3-12 minutes, more preferably from about 5-10 minutes. The final dryer 450 is likewise of multiple pass design and employs heated air having a temperature less than that utilized in the pre-dryer, namely from about 70-140° C., more preferably from about 85-110° C., with a total residence time of from about 6-20 minutes, more preferably from about 8-15 minutes.

The optional preconditioner 428 may take a variety of forms, so long as the starting mixtures are substantially uniformly mixed prior to delivery to the inlet 224; it is also possible to add moisture during preconditioning, but this is normally minimized or eliminated, owing to the high moisture content of the meat fraction of the mixtures. For example, commercially available Wenger DDC or HIP preconditioners (see U.S. Pat. Nos. 4,752,139, 7,448,795, and 9,028,133) may be used in this context. Such preconditioners may provide steam and/or water injection in order to heat and pre-cook the starting mixtures, or in some instances hot air may be used as a heating medium (U.S. Pat. No. 7,963,214). In such instances, it may be necessary to provide only a portion of the meat fraction of the mixture during passage through the preconditioner, with separate introduction of the remainder of the meat fraction directly into the input 224 of the processing device, along with the preconditioned materials, to achieve the desired total percentage of meat.

It will be appreciated that in extrusion technology there are two principal sources of energy input, referred to as specific mechanical energy (SME), and specific thermal energy (STE). SME is primarily derived from the heat, friction, and shear forces developed by the extrusion screw (s), whereas STE is generated by the addition of heat exchange media, typically steam. In existing extrusion technology, STE is most commonly added by means of direct injection of steam into the mixture being processed, either in the preconditioner, the extruder, or both. However, as indicated above, direct injection of steam can be problematical when high-meat recipes are being processed. The present invention provides a distinct improvement, in that indirect heating is achieved in the extruder, which avoids direct steam addition and the consequent excess moisture problems attendant thereto.

Example

In this example, a series of pet food runs were carried out using the apparatus of FIG. 33, with a Wenger HIP preconditioner 428, and an extruder 430 equipped with the hollow core screws illustrated in FIGS. 27-32. In addition, the extruder was provided with jacketed barrel heads allowing introduction of steam for the indirect heating of the material passing through the extruder barrel.

In each run, a dry recipe was used made up of 26% poultry meal, 36% whole potato flour, 26% yellow pea flower, 8% beet pulp, 3% flax meal, and 1% salt, all percentages based upon the total weight of the dry recipe taken as 100% by weight. The moisture content of the dry recipe was 8.6%. Two different meat sources were used in the runs, specifically mechanically separated chicken (MSC) in the form of a high-moisture emulsion, and dewatered MSC meat cake (having a moisture content of about 50% by weight) derived from initial processing of MSC using the meat dewatering assembly 10 (333 kg of MSC yields 100 kg of MSC meat cake). In general, the process involved directing the dry ingredients and the meat sources to the preconditioner 428 for mixing therein prior to delivery to the extruder 430; however, no moisture was added during preconditioning. When emulsified meat was used, it was preheated to 40° C. prior to delivery to the preconditioner. Thereupon, the preconditioned mixtures were passed through the extruder 430, and then through the assemblies 440, 446 to complete the process.

In greater detail, a total of five runs were carried out, using the following meat ingredients, as set forth in Table 2:

TABLE 2

| Run No. | MSC % | MSC Dewatered Cake % |
|---|---|---|
| 1 | 60 | 0 |
| 2 | 60 | 57.2 |
| 3 | 60 | 41 |
| 4 | 0 | 90 |
| 5 | 0 | 103 | weight percentage based upon the total weight of the dry ingredients in the mixture taken as 100% by weight In carrying out the runs, the extruder heads and hollow core screws were fully heated with injected steam. In particular, the steam was injected at a pressure of 120 psig into both the extruder heads and hollow core screws, with the steam flow through the heads at a level of about 20-45 kg/hr, with a steam flow of about 40-45 kg/hr through the hollow core screws. It can be appreciated by those skilled in the art of extrusion, that steam flow rates can be varied depending on the size of the extruder and the throughput capacities of the extrudate.

The extrusion mixtures made up of the dry recipe and meat sources were initially passed through a Wenger HIP preconditioner 428 without any injection of steam or water into the mixtures; accordingly, the preconditioner 428 thoroughly mixed the ingredients prior to introduction of the mixtures into the extruder inlet. As the product emerged from the extrusion die and entered the hood 444, fan air was blown onto the products in order to prevent them from adhering to the hood.

The following Table 3 sets forth data collected in these runs.

TABLE 3

| Run No. | Dry feed rate (kg/hr) | Cook % OE[1] | MSC kg/hr | Meat cake kg/hr | Moisture % by wt Off CVR[2] | OE[1] | OD[3] | Bulk Density (g/l) OE[1] | Off CVR[2] | OD[3] |
|---|---|---|---|---|---|---|---|---|---|---|
| 1 | 500 | 89.2 | 300 | 0 | 16.7 | 32.3 | 2.4 | 555 | 444 | 402 |
| 2 | 500 | 95.7 | 300 | 286 | 33.2 | 43.3 | 6.9 | 540 | 514 | 421 |
| 3 | 500 | 92.4 | 300 | 205 | 24.9 | 40.3 | 4.8 | 580 | 505 | 436 |
| 4 | 500 | 96.4 | 0 | 450 | 34.3 | 38.7 | 4.4 | 580 | 472 | 376 |
| 5 | 500 | 97.4 | 0 | 514 | 31.8 | 46.9 | 1.6 | 582 | 528 | 370 |

[1]OE means the cook, moisture, or bulk density values of the product off of the extruder prior to any drying thereof
[2]CVR means the moisture or bulk density values of the product taken off the pre-dryer prior to any final drying thereof.
[3]OD means the moisture and bulk density values of the product after complete drying thereof.

The following Table 4 sets forth the proximate analysis of the final, dried products:

TABLE 4

Proximate analysis (% by wt)

| Run No. | Protein | Fat[4] | Moisture | Ash | Fiber |
|---|---|---|---|---|---|
| 1 | 30.9 | 9.0 | 5.1 | 7.0 | 4.6 |
| 2 | 37.1 | 11.4 | 7.4 | 8.7 | 3.6 |
| 3 | 34.8 | 10.3 | 6.6 | 8.1 | 3.7 |
| 4 | 39.9 | 12.4 | 6.2 | 8.3 | 4.8 |
| 5 | 40.0 | 12.8 | 6.9 | 8.7 | 2.9 |

[4]The fat level was based upon the extruded and dried product, before any downstream coating thereof.

The cook values for the extruded products were all satisfactory, and the products after drying were of acceptable bulk density and product integrity. That is, the products were commercially acceptable as extruded pet feeds.

We claim:

1. A method of making an animal feed product comprising the steps of:
   a) dewatering a meat source by passing said meat source through a pair of counter-rotating, tapered, helically flighted, intermeshed screws to produce a dewatered meat product having a moisture content 45-60% by weight, based upon the total weight of the dewatered meat taken as 100% by weight;
   b) adding at least one additional ingredient to the dewatered meat product from step a) to form an extrudable mixture; and
   c) extruding the extrudable mixture from step b) through an extruder to create an extruded product, the total meat content of the extruded product being from about 40-60% by weight, based upon the total weight of the extruded product taken as 100% by weight.

2. The method of claim 1, said meat content of said extruded product having a dewatered meat amount of from about 50-100% by weight, based upon the total weight of the meat content of the extruded product taken as 100% by weight.

3. The method of claim 2, said total meat content of said extruded product consisting essentially of said dewatered meat.

4. The method of claim 1, said total meat content of said extruded product including an amount of emulsified meat.

5. The method of claim 4, said amount of emulsified meat being from about 1-50% by weight, based upon the total weight of the meat content of the extruded product taken as 100% by weight.

6. The method of claim 4, said emulsified meat comprising emulsified poultry meat.

7. The method of claim 1, said at least one additional ingredient comprising sources of starch and fat, said extruded product having a starch content of from about 5-50% by weight, and a fat content of from about 3-12% by weight, all of the foregoing percentages based upon the total weight of the extruded product taken as 100% by weight.

8. The method of claim 1, said extruded product having a moisture content of from about 6-12% by weight.

9. The method of claim 1, said extruded product having a bulk density of from about 22-40 lb/ft$^3$.

10. The method of claim 1, said extruded product having a cook value of at least about 85%.

11. The method of claim 1, said extruder having a pair of helically flighted, intermeshed, hollow core screws, said method including the step of directing a heating medium into the interior of said hollow core screws during said extruding step c).

12. The method of claim 1, said extruder having a barrel equipped with jackets, said method further including the step of directing a heating medium into said jackets.

13. The method of claim 1, including the step of carrying out said extrusion without injection of moisture into the interior of the extruder.

14. The method of claim 1, said meat source comprising a meat emulsion.

15. The method of claim 1, including the step of passing said dewatered meat product through a preconditioner, prior to step c).

16. The method of claim 1, including the step of passing said extrudable mixture through a preconditioner, prior to step c).

17. The method of claim 1, including the step of adding emulsified meat to said extrudable mixture.

18. The method of claim 1, including the step of drying said extruded product to a moisture level of from about 6-12% by weight, based upon the total weight of the extruded product taken as 100% by weight.

19. The method of claim 18, said drying step comprising the steps of first passing the extruded product through a pre-dryer using heated air at a temperature of from about 100-240° C., and then passing the extruded product through a final dryer using heated air at a temperature of from about 70-140° C.

20. The method of claim 1, said extrudable mixture having a moisture content of from about 25-48% by weight, based upon the total weight of the extrudable mixture taken as 100% by weight.

21. The method of claim 1, including the step of heating said extrudable mixture to a temperature of at least about 70° C. during said extrusion step c).

* * * * *